(12) United States Patent
Corning

(10) Patent No.: US 11,640,546 B2
(45) Date of Patent: May 2, 2023

(54) MANAGING ACCESS TO DATA AND MANAGING OPERATIONS PERFORMED BY APPLICATIONS

(71) Applicant: Nusantao, Inc., Cupertino, CA (US)

(72) Inventor: Raymond Vincent Corning, Lander, WY (US)

(73) Assignee: NUSANTAO, INC., Cupertino, CA (US)

( * ) Notice: Subject to any disclaimer, the term of this patent is extended or adjusted under 35 U.S.C. 154(b) by 381 days.

(21) Appl. No.: 16/839,005

(22) Filed: Apr. 2, 2020

(65) Prior Publication Data
US 2020/0320417 A1 Oct. 8, 2020

Related U.S. Application Data

(60) Provisional application No. 62/840,822, filed on Apr. 30, 2019, provisional application No. 62/828,363, filed on Apr. 2, 2019.

(51) Int. Cl.
| | |
|---|---|
| *G06N 5/04* | (2006.01) |
| *G06N 5/046* | (2023.01) |
| *H04L 9/06* | (2006.01) |
| *H04L 41/0806* | (2022.01) |
| *G06F 21/87* | (2013.01) |
| *H04L 9/40* | (2022.01) |
| *G06F 21/85* | (2013.01) |
| *H04L 9/00* | (2022.01) |

(52) U.S. Cl.
CPC ............ *G06N 5/046* (2013.01); *G06F 21/85* (2013.01); *G06F 21/87* (2013.01); *H04L 9/0637* (2013.01); *H04L 9/0643* (2013.01); *H04L 41/0806* (2013.01); *H04L 63/08* (2013.01); *H04L 63/123* (2013.01); *H04L 9/50* (2022.05)

(58) Field of Classification Search
CPC ..... G06N 5/046; H04L 9/0637; H04L 9/0643; H04L 63/08; H04L 63/123; H04L 41/0806
USPC .......................................................... 706/46
See application file for complete search history.

(56) References Cited

U.S. PATENT DOCUMENTS

| | | | | |
|---|---|---|---|---|
| 10,095,888 | B1* | 10/2018 | Lee | G06F 21/64 |
| 10,250,394 | B1* | 4/2019 | Borne-Pons | G06F 21/64 |
| 11,087,223 | B2* | 8/2021 | Nandakumar | G06N 5/04 |
| 11,250,336 | B2* | 2/2022 | Guim Bernat | G06N 5/04 |
| 2002/0032591 | A1 | 3/2002 | Mahaffy et al. | |

(Continued)

OTHER PUBLICATIONS

Transmittal of the International Search Report and Written Opinion of the International Searching Authority dated Jun. 30, 2020, for PCT/US2020/026474, filed Apr. 2, 2020, 12 pages.

*Primary Examiner* — Dant B Shaifer Harriman
(74) *Attorney, Agent, or Firm* — Womble Bond Dickinson (US) LLP

(57) ABSTRACT

A system architecture for managing access to data and managing operations performed by applications using the data. In one example, a secure edge module is provided. In some embodiments, a secure edge module may be provided. The secure edge module may be a secure environment that is trusted to control/manage access to different sets of data. The secure edge module may identify/authenticate applications that may perform operations on the data. The secure edge module may decrypt the data within the secure edge module and allow the operations to execute within the secure edged module, using the decrypted data.

20 Claims, 13 Drawing Sheets

(56) References Cited

U.S. PATENT DOCUMENTS

| | | |
|---|---|---|
| 2015/0379510 A1 | 12/2015 | Smith |
| 2016/0261690 A1 | 9/2016 | Ford |
| 2016/0335533 A1 | 11/2016 | Davis et al. |
| 2017/0267090 A1 | 9/2017 | Kim |
| 2019/0207749 A1* | 7/2019 | McKellar ................. G06F 21/64 |
| 2019/0342077 A1* | 11/2019 | McMurdie ............ H04L 9/3239 |
| 2019/0355025 A1* | 11/2019 | Yang .................. G06Q 30/0278 |
| 2019/0373472 A1* | 12/2019 | Smith ...................... H04W 4/38 |
| 2019/0392407 A1* | 12/2019 | Keskar ................. G06Q 50/186 |
| 2020/0169387 A1* | 5/2020 | Wei ...................... G06F 21/6272 |
| 2020/0227178 A1* | 7/2020 | Lombardi .............. G05B 17/02 |
| 2020/0320349 A1* | 10/2020 | Yu .......................... H04L 9/3239 |
| 2021/0323420 A1* | 10/2021 | Lu ............................ H02J 50/80 |
| 2022/0216998 A1* | 7/2022 | Herrin .................. H04L 9/3239 |
| 2022/0230426 A1* | 7/2022 | Kim ........................ H04L 67/12 |

* cited by examiner

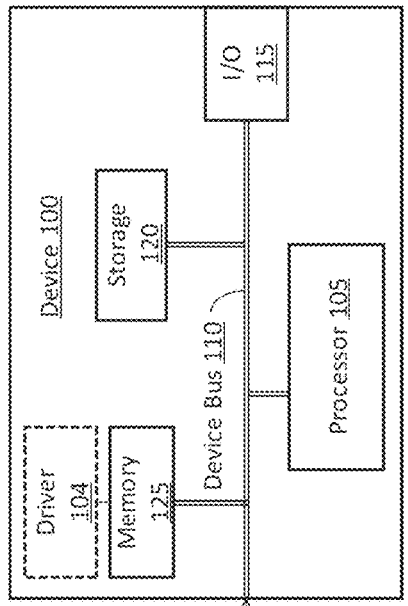
*Figure 3*
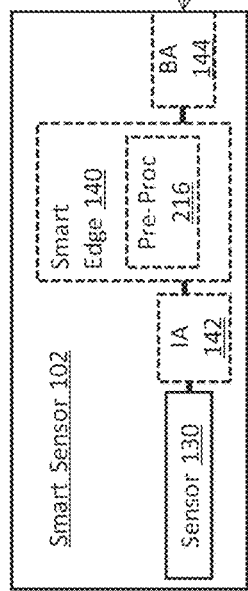
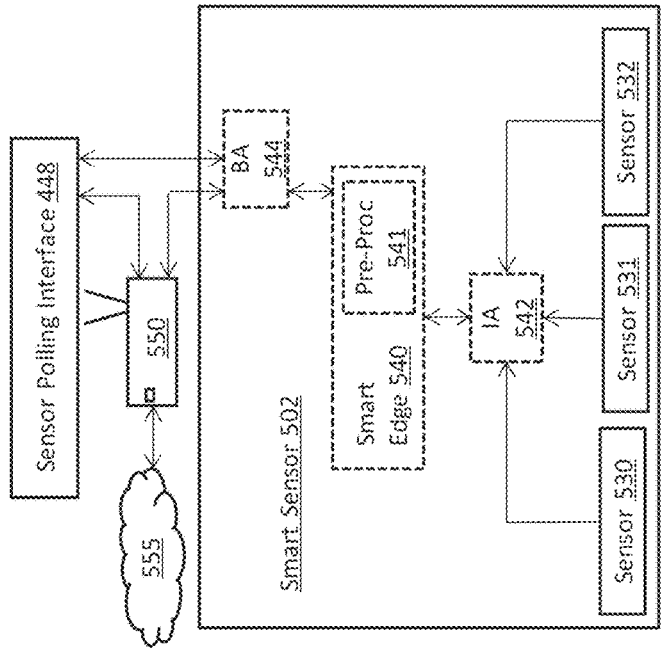
*Figure 5*
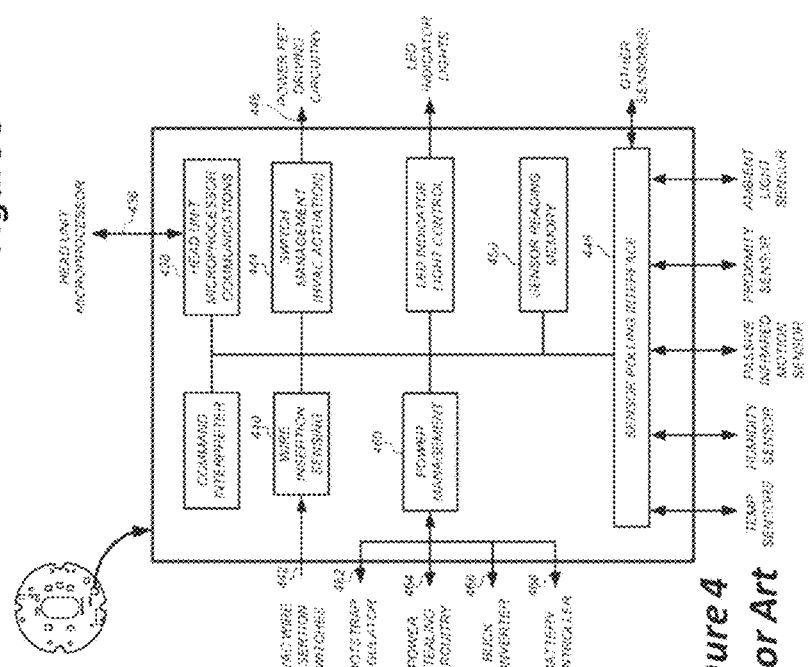
*Figure 4
Prior Art*

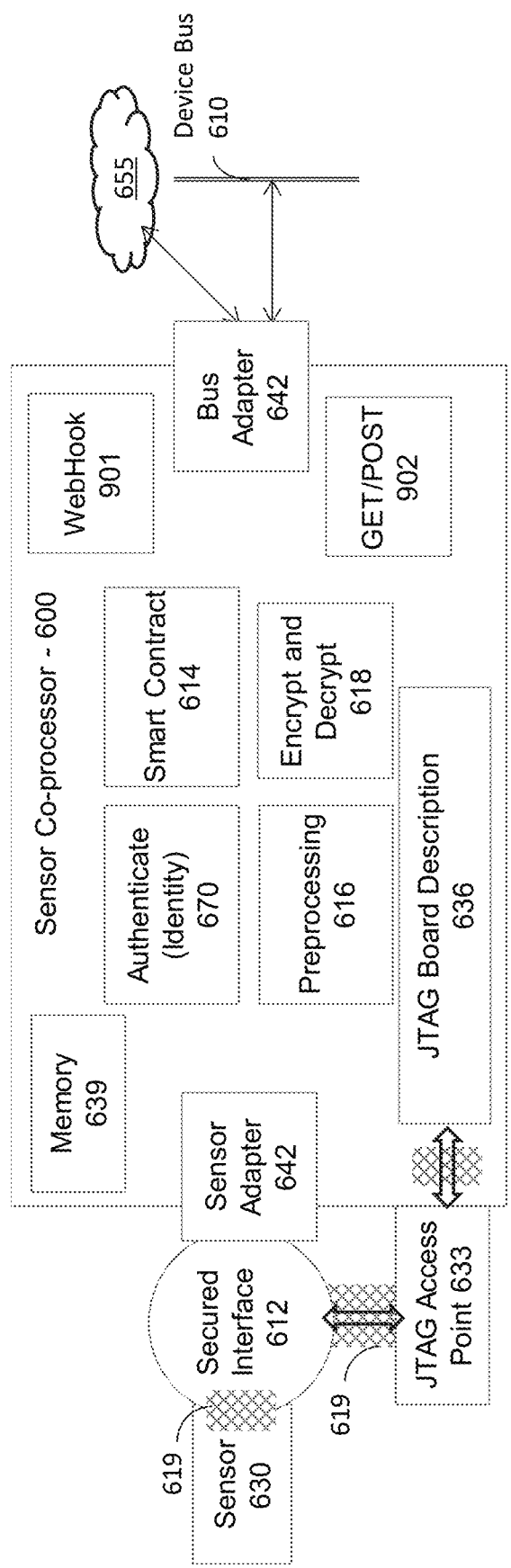
*Figure 6*
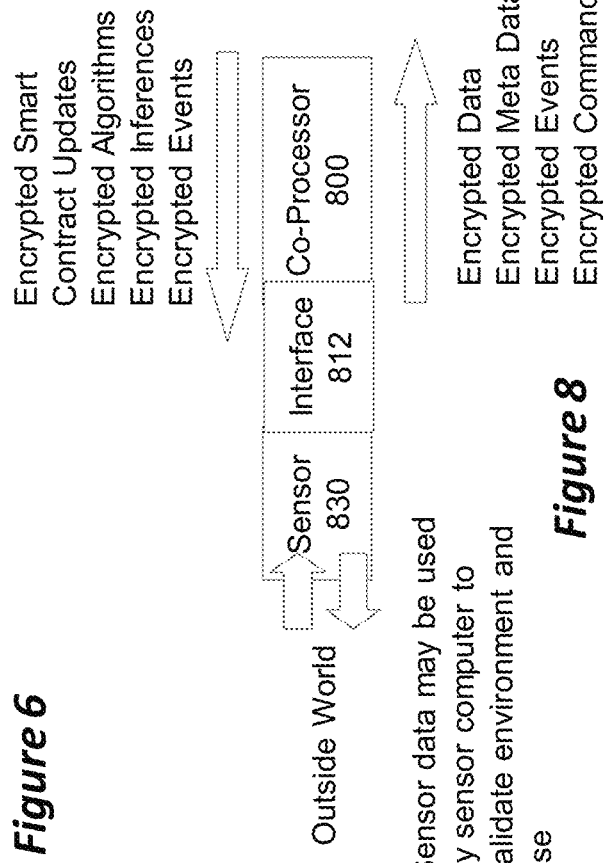
*Figure 7*
*Figure 8*

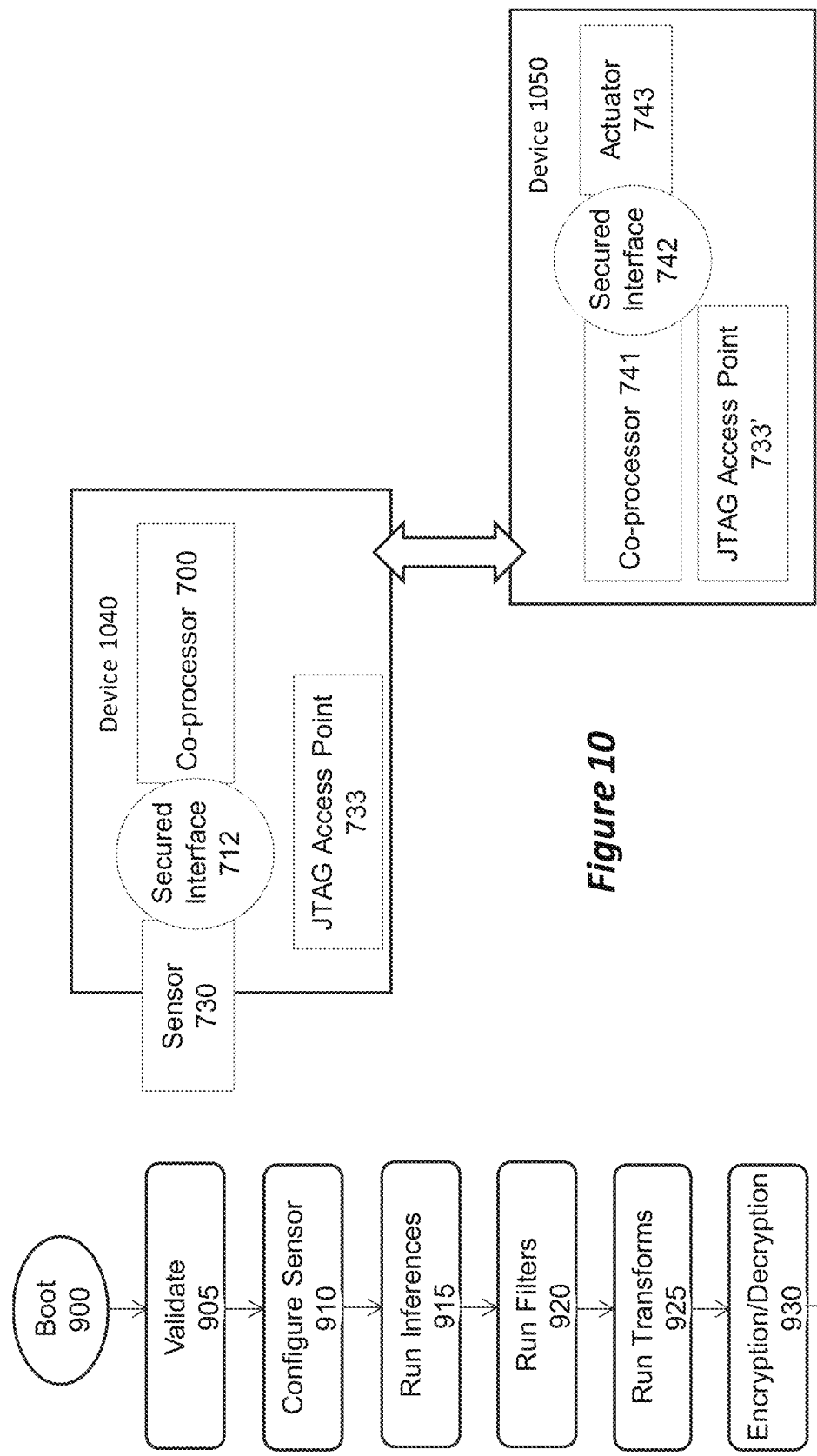

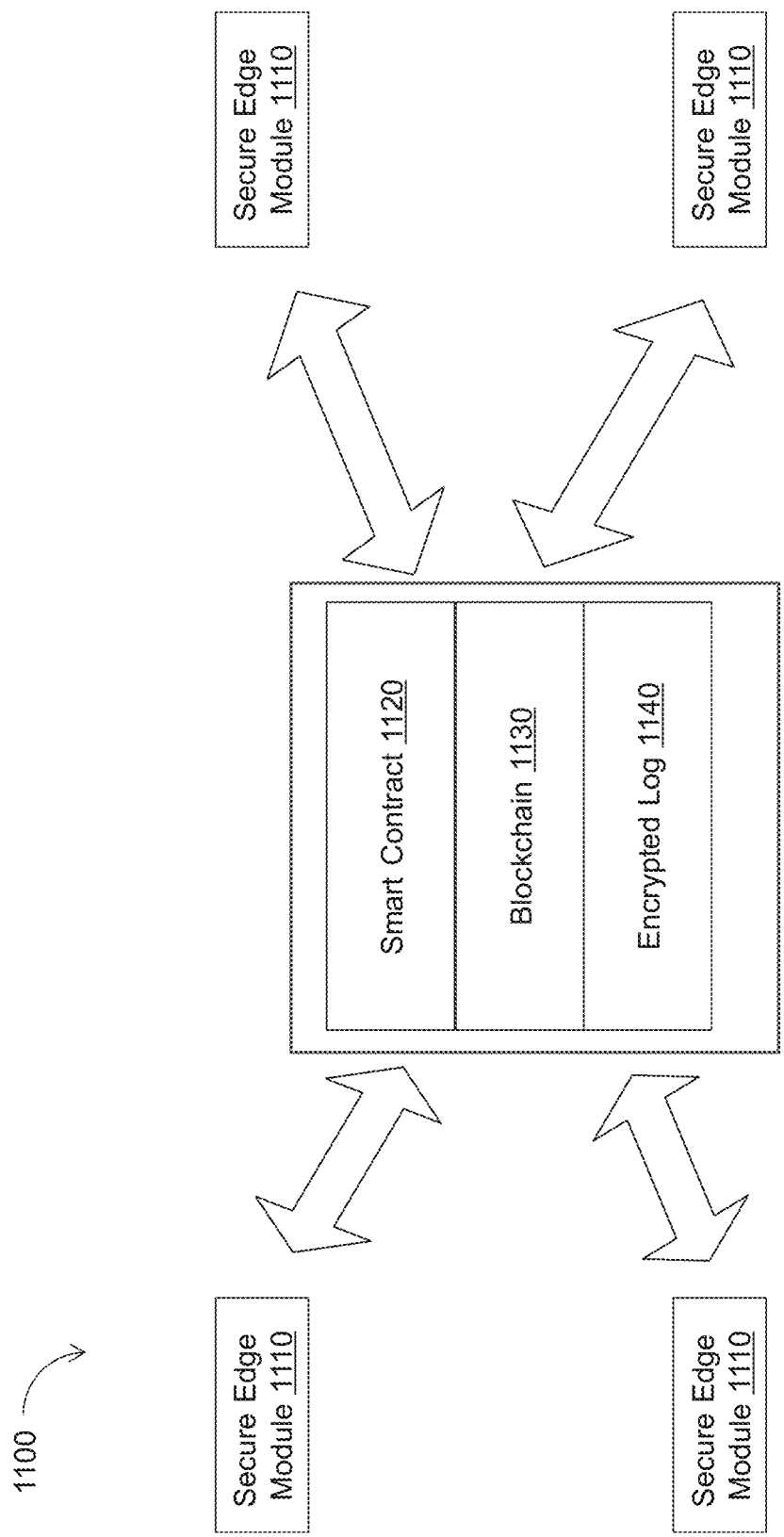

MANAGING ACCESS TO DATA AND MANAGING OPERATIONS PERFORMED BY APPLICATIONS

RELATED APPLICATION

This application claims priority benefit from U.S. Provisional Application No. 62/828,363, filed Apr. 2, 2019, and from U.S. Provisional Application No. 62/840,822, filed Apr. 30, 2019, the disclosures of which are incorporated herein by reference in their entirety. This application is also related to U.S. application Ser. No. 16/366,971, filed Mar. 27, 2019, the disclosure of which is incorporated herein by reference in its entirety.

BACKGROUND

1. Field

This application relates to managing access to data and managing operations performed by applications.

2. Related Art

Various systems are known in the art for sensing environmental events, processing data relating to the environmental events, and transmitting such data outside of the system, e.g., over the Internet, a WiFi channel, a cellular network, etc. Such systems generally have plurality of sensors to detect the environmental events and generate electric signal corresponding to the sensed events.

In the context of this disclosure, the term sensor is used to indicate any device that bridges the physical world and electronic signal processing world. For example, a sensor may be an incoming bridge from the physical world into the electronic signal processing world. In this sense, it can be said that a sensor bridges the physical world and the digital world, although in the context of this disclosure analog signals are included in the definition of digital world. For example, a microphone senses sound in the form of physical pressure changes and generates corresponding electronic signal for processing by an electronic device. Similarly, a speaker performs the reverse action by receiving electrical signal from the electronic device and generating pressure changes in the physical world to generate sound. Under the definition of this disclosure, a speaker is also considered a sensor, as it bridges the physical world and an electronic signal processing device (e.g., an amplifier). A physical action, on the other hand, describes an event in the physical world existing outside of the electronic signal processing, such as a processing device and a network. That is, reference to physical action excludes the electronic signal generation, manipulation and transmission. The term actuator may be used to indicate any device that bridges the electronic signal processing world to the physical world. An actuator may be a component that is responsible for moving and/or controlling a mechanism or system (e.g., may be an outgoing bridge from the electronic signal processing world to the physical world). For example, an actuator may be a light (e.g., a light emitting diode (LED)), a display (e.g., a liquid crystal display (LCD)), a valve, relay, motor, etc., that maybe activated and/or controlled based on an analysis/processing of sensor data.

Using the definition described herein, it can be seen that an electronic device, such as a cellphone, has multiple sensors: a microphone, a speaker, a light sensor, a distance sensor, an accelerometer, etc. These sensors exchange data with the main processor of the device. The processor may operate on the data and may also transmit the data outside of the device. In that sense, the sensors are at the edges of the network. Generally, any data generated by a sensor from a physical action is generated at an edge of the network, and is transmitted into the network via a processor, and any data destined to a sensor travels the network until it reached the sensor at the edge, where it is transformed into a physical action.

With the proliferation of mobile devices, the number of sensors is multiplied several times fold. Additionally, devices are being augmented by additional sensors in the form of wearable technology. Similarly, the Internet of Things, IoT, adds many devices that include sensors at the edge of the network, e.g., smart thermostats, smart watering timers, security cameras and door rings, etc. The data generated by all of these devices should be maintained confidential and secured.

In addition, various applications may access and/or analyze the data (e.g., sensor data) for various purposes. For example, artificial intelligence models, machine learning models, etc., may analyze the data and may generate one or more inferences or output based on the data. The amount of data that is generated continually grows and the various applications also grow more sophisticated and may continuously monitor and record the data, include sensitive or personal information/data.

3. Problem to be Solved

As artificial intelligence and/or machine learning models become more sophisticated, various users/entities may use them to continuously monitor and record much of the data that is generated by computing devices and/or sensors. Such data may include sensitive or personal data such as breathing patterns, heart functionality, genetic profiles, location, movement, etc. An emerging problem is the application of artificial intelligence algorithms to data sets outside of the scope and purpose for which the data was originally collected.

The access to and use of the data has resulted in various breaches of privacy and have resulted in the use of data for unintended purposes. For example, data from Facebook surveys were used to generate psychological profiles which were in turn used to target and manipulate voting behavior. Using GPS coordinates could allow identification and targeting of religious affiliations of various users. Sexual orientation could be determined by analyzing purchase behavior, movie watching behavior, and/or correlating fitness tracking data such as heart rate with stimulus presented. Sexual activity could easily be profiled using fitness data based on heart rate and accelerometer data.

As we delegate evaluation of information and human decision making to computer applications (e.g., algorithms, artificial intelligence models, expert systems, etc.) to make decisions and/or inferences which may greatly impact users and/or society, it is becoming increasingly important and/or useful to identify and authenticate those applications that make decisions on our behalf. Identifying and authenticating these applications may help prevent the abuse of computer algorithms and artificial intelligence inferences.

Currently our digital procedures are designed to authenticate users, but authentication of application instances and the various artificial intelligence and machine learning models and trained inferences is often not performed. Accordingly, a need exists for a system which controls access to data and manages the operations that an application is allowed to perform, based on the identity and/or authentication of the applications.

SUMMARY

Embodiments of the invention provide a system architecture that protects against unauthorized access to data, such as sensor data, behavior data (e.g., browser cookies, shopping history, etc.), etc. A device that generates and/or obtains data (e.g., sensor data such as GPS data, biometric data, etc.) may encrypt the data prior to providing the data to the device's processor. For example, before providing audio data from a microphone of a smartphone to a processor of the smartphone the data may be encrypted by a smart edge module, as discussed in more detail below. However, it may be useful to perform operations, analyses, etc., on data (e.g., sensor data). For example, applications, such as artificial intelligence or machine learning models, may perform operations, actions, functions, etc., on the data to generate inferences, insights, output, etc. These operations, analyses, etc., may provide useful insights for various users. For example, an artificial intelligence model may be able to predict when a user is about to suffer a heart attack based on sensor data (e.g., biometric data such as heart rate, blood pressure, etc.).

Although some applications may provide useful inferences/insights using a set of data, other applications may use same set of data (and/or other data) to generate inferences/insights that may be outside the scope/purpose for which the data was original collected. The embodiment, implementation, examples, etc., herein address this, and other issues, by controlling/managing access to data and the operations that an application is allowed to perform, based on the identity and/or authentication of the application.

In some embodiments, a secure edge module is provided. The secure edge module may be a secure environment (e.g., one or more computing devices) that is trusted to control/manage access to different sets of data (e.g., sensitive, private, personal, etc., data). The secure edge module may identify/authenticate applications that may perform operations on the data (e.g., generate inferences, predictions, etc., based on the data). For example, the secure edge module may verify serial numbers or hashes (e.g., fingerprints) of applications (e.g.,). In particular, the secure edge module may generate hashes of various files and compare the generated hashes to those stored in the smart contract as a method of validating an application and/or the application's environment. These hash values may be used to validate digital applications and/or environments much as fingerprints are used to identify humans. The secure edge module may also allow applications to perform certain, authorized operations on the data. For example, the secure edge module may allow an application to use sensor obtained from a smartwatch to generate inferences about the number of calories burned during exercise, but may not allow the application to generate inferences about locations that a user has visited. The secure edge module may be separate from the devices that generate the data. For example, the secure edge module may be one or more server computers that are separate from smartphones which generate sensor data (e.g., may be separate from smart edge modules that are described in more detail below).

In some embodiments, the secure edge module may use one or more smart contracts to control/manage access to data and the operations performed by various applications. A smart contract may be a document, file, or other data that may indicate which applications have access to a set of data. For example, the smart contract may indicate that an application has access to heart rate data, but not to location data (e.g., GPS data). The smart contract may also indicate the types of operations that an application is allowed to perform on the data. For example, the smart contract may indicate inferences about incomes of users are allowed other inferences (e.g., inferences about users' voting preferences) are not allowed. The secure edge module may be configured such that the secure edge module programmatically enforces the smart contracts. For example, the secure edge module may refrain and/or may be unable to allow access to data and/or unable to perform operations that are not allowed by a smart contract.

In some embodiments, the data that is used by the various applications may remain encrypted unless it is stored/located within a secure edge module. This may prevent the data from being accessed and/or used by unauthorized applications because the secure edge module may not allow applications to perform operations (e.g., to execute) unless specified by a smart contract. This further prevents unauthorized access to the data.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 3 illustrates a block diagram of a "stand-alone" smart edge module according to an embodiment of the invention.

FIG. 4 is a prior art illustration of a smart thermostat.

FIG. 5 illustrates a block diagram of a smart edge module implemented for the smart thermostat of FIG. 4, according to an embodiment of the invention.

FIG. 6 is a high-level schematic of a co-processor according to an embodiment.

FIG. 7 illustrates an example wherein the sensor and co-processor are part of an electronic device.

FIG. 8 is a schematic illustrating communication channels according to an embodiment.

FIG. 9 is a flow chart illustrating processes that may be executed by the co-processor, according to embodiments.

FIG. 10 illustrates an example wherein an electronic device incorporates a sensor and an actuator.

FIG. 11 illustrates an example system architecture according to one or more embodiments of the resent disclosure.

DETAILED DESCRIPTION

The following detailed description provides examples that highlight certain features and aspects of the innovative secure sensors system claimed herein. Different embodiments or their combinations may be used for different applications or to achieve different results or benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

In the various disclosed embodiments, data security is ensured by implementing the security processes at the edges of the technology stack. For example, data generated at the edges (i.e., by sensors) is pre-processed and encrypted at the edges upon creation. The encrypted data then remains secured throughout its transmissions and processing, until it is ready to be consumed at another edge (e.g., by another sensor), at which point it is decrypted. In this manner, any interception of the data prior to authorized consumption is able to only obtain encrypted data, which can't be deciphered without the proper key. A blockchain smart contract may be used to ensure that only authorized stakeholders can decide who will have access to the data, the metadata and the identity of the data generator. The smart contract defines stakeholders, device configuration, appropriate encryption keys for stake holders, ACL "Access Rights" to configuration (View, Modify), data (View), and meta-data. The smart contract may be maintained using GIT protocol, which is a distributed version-control system for tracking changes. The hash value of events and changes can be stored to global blockchain and when retrieved can be used by stakeholders to find correct versions and as validation.

Figure 1:
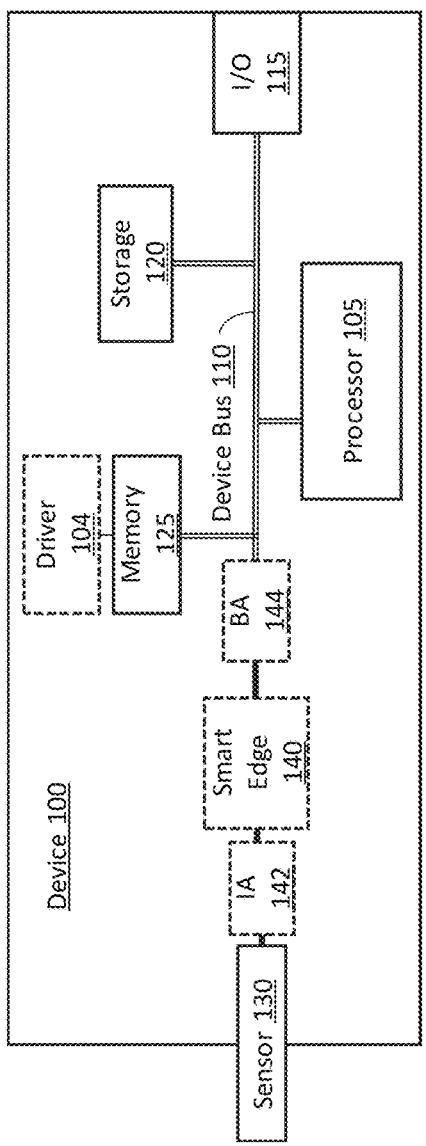
FIG. 1 illustrates a block diagram of an electronic device according to one embodiment.

FIG. 1 is block diagram schematically illustrating elements of an electronic device 100, according to an embodiment implementing edge security. Device 100 may be any electronic device, such as, e.g., a computer, a cellphone, a smart thermostat, a wearable device, etc. Device 100 may include many elements; however, only elements pertinent to the understanding of the embodiment are included in FIG. 1. For further clarity, in FIG. 1 elements that are conventional to device 100 are shown in solid lines, while elements that are novel and added by the embodiment are illustrated in dotted lines.

The device 100 is managed by a device processor 105 (e.g., iPhone Ax processor, Samsung's Exynos processor, Intel Core ix processors, etc.), executing instructions of an operating system (OS, e.g., Windows, iOS, WebOS, Android, etc.), and which communicates over device bus 110. The device bus 110 is connected to I/O module 115, which may include wired elements, such as Ethernet connection, and/or wireless elements, such as, e.g., WiFi, cellular, Bluetooth transceivers (not shown). Storage 120 is also attached to the bus 110, and may be used to store programs, data, etc. Memory 125 is used by processor 105 to save items needed for current processes, including running OS. Memory 125 is generally a cache memory.

Device 100 may include several sensors 130, but for simplicity only one is illustrated. Sensor 130 may be, e.g., microphone, imaging sensor, accelerometer, etc. Sensor 130 is illustrated partially outside the box of device 100, to indicate that it may be internal or external to the device 100. For example, a cellphone has an internal microphone, but may also use an external microphone as a part of a wired or wireless headset.

In the prior art devices, when sensor 130 detects a physical event (e.g., sound generated by pressure change in the case of a microphone), sensor 130 generates a signal that includes the data corresponding to the physical event. The signal of sensor 130 is sent over the device bus 110 to the processor 105. The processor 105 may operate on the signal, store the data in storage 120, and/or transmit the signal over I/O module 115. Thus, a hacker able to exploit vulnerability in the device's security system can get access to the processor 105 and/or storage 120, and thereby to the data. Similarly, a hacker able to intercept communication sent from the I/O module 115 may be able to gain access to the data.

The embodiment of FIG. 1 prevents access to the sensor data, even upon a breach of security measures. Specifically, a security module 140, referred to herein as smart edge module, is interposed between the sensor 130 and processor 105. The smart edge 140 intercepts the signal with the raw data from the sensor, prior to the signal reaching the processor 105. The smart edge 140 encrypts the data and issues an encrypted signal to the processor 105. The processor 105 only receives encrypted data, such that when the processor stores or transmits the data, it is already encrypted. Consequently, any breach which gains access to the processor 105, the storage 120, or intercepts a transmission, may only obtain the encrypted signal and thus be unable to decipher the data.

A device driver 104 resides in memory 104 and provides the communication link between the outside world and the smart edge 140, akin to a printer driver or any other device driver that enable communication with peripherals. Since driver 104 operates outside of the smart edge 140, it is considered to be operating in an insecure environment, and thus everything it handles is already encrypted. Driver 104 is responsible for transferring encrypted data to the smart edge (and sensor 130) and is responsible for transferring encrypted data to a targeted location (e.g., processor 105). Since the data handled by driver 104 is encrypted, corruption of the device driver 104 could cause an interruption of service, but could not cause a data leak.

In order to make smart edge 140 universal for all sensors and buses, an interface adapter 142 handles transmissions between the smart edge 140 and sensor 130, while bus adapter 144 handles transmissions between smart edge 140 and device bus 110. Device bus 110 may be any known bus technology, such as, e.g., Direct Memory Access, SPI, Ethernet, etc.

With the embodiment of FIG. 1, data from sensor 130 is secured and cannot be deciphered without a decryption key. Going back to the example of a hacker taking control over a camera by infiltrating the processor 105, by implementing the embodiment of FIG. 1, the hacker may only receive an encrypted transmission and will be unable to view the images from the camera, i.e., sensor 130.

Figure 2:
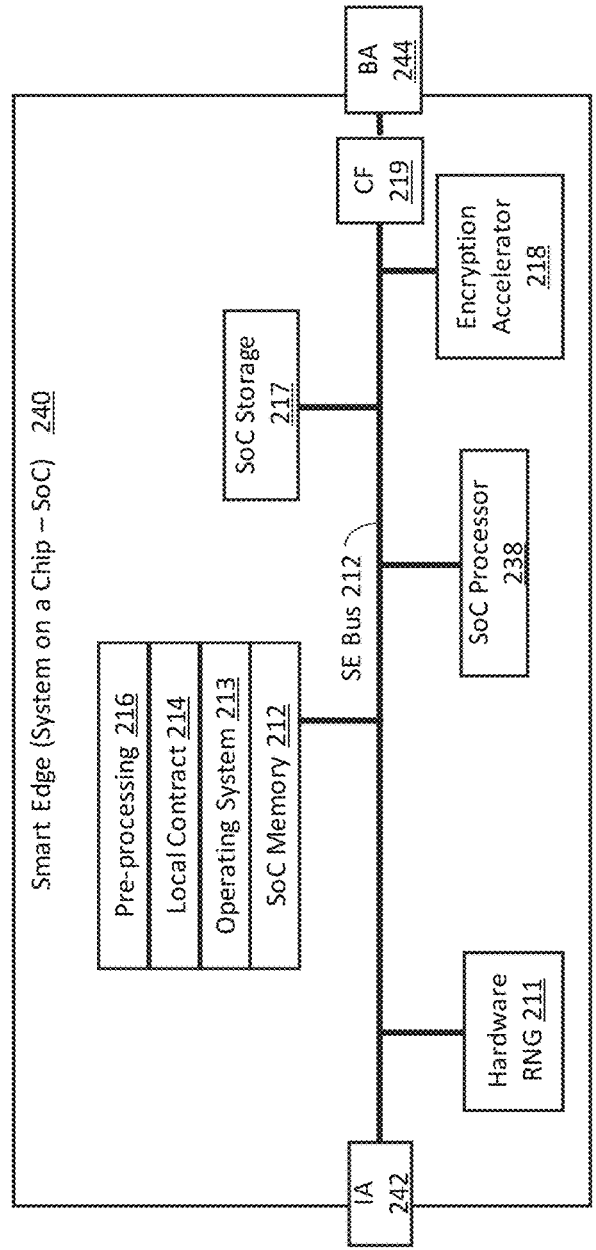
FIG. 2 illustrates a block diagram of a smart edge module according to an embodiment of the invention.

FIG. 2 illustrates an embodiment of smart edge 240, implemented in this example as a system on a chip (SoC). As shown in this example, the smart edge 240 incorporates the interface adapter 242 and bus adapter 244 to handle communication with elements outside the smart edge SoC 240. Communications within smart edge 240 run on internal bus 212, which is considered secure by the smart edge 240. The operations of the smart edge 240 are controlled by the smart edge (SE) processor 238, which executes secured operating system 213, residing in a secure smart edge memory 212.

The OS 213 may be, but is not limited, to an implementation of Linux, a minimal version of linux such as Busybox, an environment such as MicroPython, or a real-time operating system (RTOS) such as VxWorks. In order to maximize security, all unnecessary functionality is removed from both the OS and from necessary protocol stacks. In addition, the OS is protected by command and response filters (CF 219). The CF 219 ensures that only necessary commands are passed to the local smart edge OS 213. The purpose is to ensure that it is not possible to trigger unknown OS behavior (e.g., prevent "magic packets"). Response Filters insure that responses to commands can only include known information targeted at known locations.

Smart edge storage 217 is used, among others, to store the local operating system, the un-encrypted Smart Contract (i.e., Configuration Data), local authentication program and local programs. The smart edge storage 217 may also act as a cache for storing sensor data and metadata/logs until successful network transmission.

In this embodiment, all elements outside of the smart edge are considered unsecured, and all elements within the smart edge are considered secured. This is ensured by prohibiting any communication into the smart edge in non-encrypted form. All inbound communications and/or data must be encrypted by a known key to be accepted and handled by the smart edge. Similarly, all outbound communication from the smart edge must first be encrypted.

Anything outside the smart edge that exists in a non-encrypted format or in an encrypted format by an unknown key is assumed unsecure. Consequently, the sensor data exists in a non-encrypted format only inside the secured smart edge. The sensor data can exit the smart edge only in a secure encrypted form. The encryption may be, e.g., Blowfish, Twofish, Simon, etc. Decryption of the encrypted data would require multifactor authentication, using a public and a personal key.

The encryption of the raw data may be performed according to instructions of a local contract 214 stored in the module memory. For increased security the local contract 214 may be a blockchain contract. The hardware random number generator RNG 211 and optional encryption accelerator 218 may be used for the encryption and decryption functions. The initial key is set at the factory in the initial local smart contract and must be replaced by the purchaser before use. The initial key is assumed to be unsecure.

As indicated, everything outside the smart edge is considered non-secured. Since driver 104 resides in memory 125, outside the smart edge, it is considered non-secured. On the non-secure side, standard IT procedures may be used to limit incoming information to known hosts using standard firewall technology. Also, TLS (Transport Layer Security) may be used in the unsecure transmission to "wrap" the encrypted information that is being sent to the smart edge, so as to prevent eavesdropping, tampering and/or message forgery.

In one embodiment, when a transmission is received addressed to the sensor 130 or smart edge 140, the non-secure driver 104 may perform a basic check of entropy (randomness) as a "first level" indication of encrypted content. If accepted, the transmission is then inspected by the command filter 219, which attempts to decrypt the file using its private key and look for header information inside the encrypted packet. If the correct heather is found, the process would continue decrypting the payload; otherwise the packet(s) would be discarded. This process is one example of ensuring that only encrypted transmission reaches the smart edge, thus thwarting any malicious attempt to disrupt or alter the operation of the smart edge.

Generally, incoming data transmission would fall into one of five categories: 1) Smart Contract Updates that were requested; 2) Responses to verification/validation requests to configured smart edges (per smart contract); 3) Requests for verification/validation from configured smart edges (per smart contract); 4) Responses for requests for blockchain update (per smart contract); and 5) Pushed blockchain updates (if configured in smart contracts). Also, all contact with smart edge should be originating from known entities and the majority of communication would be coming in response to a request that was sent by the smart edge. Moreover, for highly secure uses, it would be possible for the smart edge to only allow polled responses and reject all other communications. In this case, when the packet header is decrypted, the packet would be discarded if it did not come from the appropriate sender and in response to the correct outstanding request.

As indicated above, there are applications wherein the sensor is an element that is separate from the electronic device 100. For example, a cellphone may be operated with a wired or wireless headset, such that the microphone is not an integral part of the device, i.e., the cellphone. FIG. 3 is a block diagram illustrating how the smart edge may be implemented in such applications. The device 100 is shown separate from the smart sensor 102, which is a stand-alone smart sensor incorporating a smart edge 140. In this example, the bus adapter 144 may be, e.g., a Bluetooth device communicating with device bus 100 via a corresponding Bluetooth interface of device 100. In this manner, all of the data from the sensor, e.g., microphone, 130 is transmitted to the device 100, e.g., cellphone, in an encrypted format.

FIG. 3 illustrates another feature that may be implemented in any of the embodiments disclosed herein. Specifically, the smart edge module 140 incorporates a pre-processing module 216 (see also FIG. 2). Pre-processing module 216 conditions and filters the data from the sensor prior to encryption and transmission of the data. This is done, for example, to reduce the amount of data transmitted, such that only usable data is being encrypted and transmitted. To illustrate, turning back to the example wherein sensor 130 is a microphone, part of the raw signal from sensor 130 may include background noise, wind noise, etc. Pre-processing module 216 is configured to operate on the raw signal so as to filter out raw signal that is not from the person speaking into the microphone. The filtering may be done, e.g., by setting a minimum and maximum decibel levels, by setting a frequency range, etc. Consequently, only the signal relating to the spoken words is being encrypted and transmitted. Incidentally, this pre-processing also preserves battery life, as the power requirements of the filtering is much lower than the power requirement of the transmission of all the data from the microphone.

In this aspect, a smart sensor is provided, comprising: at least one sensor generating raw data signal; an interface adapter facilitating communications with the at least one sensor; a smart edge having a processor receiving the raw data signal and generating an encrypted data signal; and a bus adapter transmitting the encrypted data signal. The bus adapted may comprise a wireless transceiver. The smart edge may further comprise a pre-processing module configured to filter the raw data signal prior to the processor generating the encrypted data signal. In this respect, the processor encrypts only part of the raw data signal corresponding to a filtered signal.

FIG. 4 illustrates a prior art "smart" thermostat, and corresponds to FIG. 4B disclosed in U.S. Pat. No. 8,622,314. As shown, the smart thermostat receives signals from several sensors, such as temperature sensor, humidity sensor, etc. The signal from these sensors is a raw signal and is being polled by the sensor polling interface. Consequently, a hacker gaining access to the thermostat has direct access to all of the raw data from the sensors. This can be prevented by using a smart edge to encrypt the data of the sensors prior to transmission to the thermostat.

FIG. 5 illustrates an embodiment of a stand-alone smart sensor, implemented in the context of a device such as the smart thermostat of FIG. 4. As before, FIG. 5 illustrates advantageous features that may also be implemented within the other embodiments and are not limited to their use in the embodiment of FIG. 5. For example, as illustrated in FIG. 5, smart sensor 502 actually includes a plurality of sensors, 530, 531, 532, etc. That is, the disclosed smart edge 540 is not limited to handling raw data of a single sensor, but can be implemented in arrangements wherein several sensors are coupled to a single smart edge 540. In the context of the smart thermostat, a single smart edge 540 may handle all of the raw data from all of the sensors.

Another feature illustrated in FIG. 5 is the option to have the bus adapter 544 communicate directly with the electronic device, e.g., the sensor polling interface 448 of the thermostat, or interface directly with a network via, e.g., modem 550. Notably, by having bus adapter 544 set as a WiFi transceiver communicating with the modem 550, the encrypted data can be utilized with several authorized devices, and is not limited to only a single device. For example, the smart thermostat can access the data by communicating with the smart sensor via modem 550 in an intranet fashion, while a cellphone may access the data remotely via connection to the Internet 555.

Incidentally, for clarity the embodiment of FIG. 5 is illustrated as retaining the polling interface 448. However, it is not necessary to include the poling interface 448. Rather, the data may be encrypted and transferred in a fashion that does not necessitate the polling, or can be transferred to a location that can be polled.

The embodiment of FIG. 5 decouples the generation and encryption of the sensor data from the consuming of the data. Consequently, the generated encrypted data can be consumed by all authorized devices. Such an implementation is particularly useful in IoT applications. For example, a smart LED light bulb can be implemented using the embodiment of FIG. 5. In such an implementation, the bus adapter 544 would be communicating directly with the modem 550, enabling any authorized device to receive the signal from the light bulb and control the operation of the light bulb.

In this aspect, a smart sensor is provided, comprising: a plurality of sensors, each generating raw data signal; an interface adapter facilitating communications with the plurality of sensors; a smart edge having a processor receiving the raw data signal from each of the plurality of sensors and generating an encrypted data signal; and a bus adapter transmitting the encrypted data signal. The bus adapted may comprise a wireless transceiver. The smart edge may further comprise a pre-processing module configured to filter the raw data signal of each of the sensors prior to the processor generating the encrypted data signal.

FIG. 6 is a high-level schematic of a co-processor according to an embodiment wherein the sensor and co-processor are not necessarily part of an electronic device. Sensor 630 communicates with the co-processor 600 via secured interface 612. The secured interface 612 enables communications between the sensor 630 and sensor adapter 642, which is similar to IA 142 of FIG. 3 or IA 542 of FIG. 5. The co-processor 600 incorporates an encrypt/decrypt module 618, a preprocessing module 616, and an authenticator 670. The co-processor communicates with a device bus 610 or a network 655, such as the Internet, via the bus adapter 642, using the WebHook and/or get/post modules 901 and 902. All communication and signal processing is performed per the provisions of the smart contract 614.

Securing and maintaining the integrity of the interface 612 may be accomplished in various ways. Physically, a physical barrier can be provided to prevent physical access to the JTAG (Joint Test Action Group) access point. For example, the sensor 630, interface 612 and co-processor 600 can be embedded in epoxy-like material to prevent physical tempering. In some embodiments JTAG is implemented and its test access points are also embedded in epoxy to prevent malicious hardware-based attacks. The integrity of the connection between the sensor 630 and co-processor 600, and the PCB board/device that the co-processor 600 is mounted in can be tested using JTAG board description 636 embedded in the co-processor 600. In an example, the co-processor 600 is connected to a JTAG access point 633 on the PCB board and can conduct JTAG chain scans using an optional Boundary Scan Description Language (BSDL) file describing the board that is referenced in the smart contract. Such functionality can both validate that a contract manufacturer built the PCB board as specified, and that no one intentionally or unintentionally modified the design of the physical PCB board. Thus, it also protects the board/device from physical tampering after manufacturing when in the sales/delivery channel or when deployed to the field.

For improved security the JTAG access point 633 may be embedded in resin to prevent external access. Moreover, in disclosed embodiments a wire mesh (exemplified by 619) may also be embedded in the epoxy over the JTAG Access Points, the connections between the JTAG and the interface, and the connections between the JTAG and the co-processor, or any combination thereof. A small potential or current may be applied to the wire mesh so that any unauthorized attempt to access the JTAG Access Points can be sensed by the change in potential or current in the wire mesh.

An example where the sensor and co-processor are integral part of an electronic device is illustrated in FIG. 7. In FIG. 7, device 740 may be, e.g., a mobile device such as a smartphone. Sensor 730 may be any of the standard sensors incorporated in a cellphone, such as a microphone, an accelerometer, a light sensor, a pressure sensor, etc. A secured interface 712, implemented according to any of the examples provided herein, facilitates communication between the sensor 730 and the co-processor 700. Both interface 712 and co-processor 700 have connections to the JTAG 733 of device 740. In this example, the co-processor 700 incorporates a JTAG dongle in order to conduct boundary scans on both the device 740 and the secured interface 712 to verify and authenticate the device, the interface and the sensor. The PCB board's Boundary Scan Description Language (BSDL) file describing the device 740 and the secured interface 712 is provided by optional URI (Uniform Resource Identifier) located in the smart contract (e.g., 614). Once the BSDL file is retrieved from the URI, it may be stored locally by the co-processor 700. The co-processor 700 uses the JTAG test access points 733 to validate that the device 740, the PCB board and the secured interface 612 have not been modified. The secured interface 712 is epoxy wired with a chain of JTAG interfaces 733 to provide anti-tampering measures.

In the embodiments, the co-processor 600 may support three connection types. A serial interface enables communication to a JTAG access point on the board/device that the co-processor 600 is mounted in. Communications with the secured interface 612 may be accomplished through the sensor interface adapter 642. Communications with a device bus 610 or a network 655 can be accomplished via the bus adapter 642 using TCP/IP module supporting HTTPS (GET, PUT, POST, DELETE, PATCH—902) and an HTTPS based Webhook 901. Optionally a GraphQL interface and/or streaming interface, such as Data Stream Interface (DSI), may also be supported to enable interactions with API's and other applications.

An example of various communications of the co-processor is provided in FIG. 8. Using the various communication channels, the co-processor 800 receives information about the physical world through the sensor 830 or sends information to the outside world using the sensor 830, in the form of an output device such as a speaker, monitor, or other output device. The TCP/IP interface receives encrypted information that can include smart contract updates, Blockchain updates, functions/algorithms, inferences, events, etc. The TCP/IP interface sends encrypted information that can include data, metadata, events, commands, etc.

Among the functions that may be performed by the co-processor are environment authentication and cyber-attack identification and filtering. The co-processor can be used to locally monitor external phenomena received through the sensor using a locally deployed function or inference. Inferences can be deployed to fingerprint and authenticate the external environment. These inferences may be shared with peers configured in a smart contract in order to validate the environment and/or mesh (community). Inferences or functions can be programmed to detect false input or signs of cyber-attacks and to implement filters on identification of an attack in order to mitigate the effect of the attack. For example, the detection of a laser pointer focused on the video input on a self-driving car, the jamming of a GPS receiver, or a targeted sound attacks on road noise sensors. Mitigation could include filtering targeted sound and raising an alarm of active cyber-attack. The benefits of running these inferences locally include the speed of response, implementation of mitigation, and fast notification.

In order to ensure no tempering has been done during the chain of custody from manufacturing to the final user, the following operations may be implemented, as illustrated in FIG. 9. The elements illustrated in FIG. 9 are not necessarily steps in a sequential process, but rather individual processes that may be executed by the co-processor as needed.

On boot 900, the co-processor proceeds to validate that the device and sensor interface were not tampered with by interrogating JTAG chains and match to the design as specified in the smart contract. The JTAG interrogation may include reading IDs of other electronic part attached to the board, measuring path resistance of various contacts and conductive lines, measuring electrical current of various contacts and conductive lines, measuring timing of various signals on contacts and lines, etc. Illustrated by process 905 and executed on every boot of the device, thereby detecting whether a contract manufacturing or other third parties modified or tempered with the design to intentionally add additional functionality, such as tapping into the sensor or the smart edge, or installing additional redundant sensors in order to bypass the smart edge security.

If validation is positive, the sensor is configured by process 910. An optional interference or function module 915 to validate external environment is run on the raw data stream to determine whether a physical attack is being executed against the sensor, such as laser light, white noise, etc. Facilities to tap the raw data stream may be provided in order to visualize the data stream during model building stages to determine features for extraction.

Next, in process 920 a chain of 0 to N filters are applied to the data stream. The purpose of these filters is to reduce the data set that must be processed to match the data features targeted for extraction. Examples of filters include max, min, standard deviation, and sampling. In process 925 a chain of 0 to N transforms are applied. The purpose of these transforms is to further process the data in order to reduce the data set, and to extract and amplify the features selected. Transforms may include fixed or custom functions and/or artificial intelligence inferences. Transforms may be used to output data sets in a specific format, output partial inference models, or output predictions generated by local inferences, including generating lambda expressions and/or one-hot encoding. Example output formats may include: JSON, Flatbuffer, Numpy Array, Pandas Data Frame, Tensorflow Dataset, and .csv.

Once the sensor stream is fully transformed, the output is encrypted (930) and sent to the location specified in the smart contract. The transform facilities can be used to optionally watermark the output signal. An example would be to integrate a sound pattern (beep, etc.) or a video pattern (blink, etc.) into the output signal to enable authentication and verification.

In process 935 data may be received (e.g., via webhook) for output to the sensor (e.g., speaker, screen, etc.). The received data is decrypted and sent as output stream to the sensor.

The Note that some or all of the components, modules and/or processes as shown and described herein may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

As already noted above, in many situations a device may have a source and a sink, the source generating a signal corresponding to a physical event, and the sink receiving the signal and performing an action based on that signal. FIG. 10 illustrates an example wherein an electronic device incorporates a sensor and an actuator, the sensor forming the source and the actuator forming the sink. In this context, the sensor senses actions in the real world and generates a corresponding signal for the digital world, thus acting as the source. The actuator is any sink that uses the signal from the sensor to generate an action, e.g., a mechanical actuator, a light (LED, Monitor, etc.), a speaker, an app using the input from the sensor, etc. For example, a sensor may be measuring wheel angle of a car and the actuator may be electrical power steering; a sensor may be a microphone while the actuator may be a speaker; a sensor may be an accelerometer while the sink may be a health app calculating steps walked, etc.

While FIG. 10 illustrates two separate devices, 1040 and 1050, these may be the same device or two separate devices on the same platform, e.g., two different devices in the same car, or two separate devices on two different platforms, e.g., Device 1040 being a cellphone and device 1050 being a server on the cloud. The depiction of FIG. 10 is therefore general schematic covering all of these possibilities.

All of the embodiments described herein are equally applicable to the operation of the device 1050, simply considering the actuator 743 as the sensor of any of these embodiments. Since the actuator 743 may cause action in the real world, it is imperative to authenticate any command or signal received by the actuator and ensure that no part of the actuator of its command chain was compromised and/or tempered with. Therefore, the signals to the actuator are sent encrypted and are only decrypted when received by the co-processor 741. The co-processor 741 decrypts the signals and communicates the decrypted signal to the actuator 743 via the secured interface 742.

As with prior embodiments, upon boot the co-processor 741 runs a JTAG interrogation to verify that device 1050 has not been compromised and/or tempered with. If the test fails, a warning may be issued and/or the device may generate an error and fail to initiate.

As with the other embodiments disclosed herein, the co-processors 1040, 1050, the secured interfaces, 712, 742, and/or the sensor 730 and actuator 743 may be fabricated as a System-on-Chip (see FIG. 2). Also, as noted, various hardware anti-tampering measures are implemented to prevent boards from being built intentionally or by field modification in a way that bypasses secure edge security and encryption features. This includes embedding various parts in epoxy, covering various elements in wire mesh and monitoring electrical current or potential applied to the mesh, running a JTAG interrogation upon each boot, etc. If any tempering is detected, the secure edge could be configured to do any or all of the following: securely erase all programs and data, generate compromise message, permanently disable secure edge, etc. The epoxy and mesh arrangement can also be used to securely connect the sensor to the smart edge. This feature may be implemented to prevent and block physical attacks where a second tap connection is made to the sensor and thereby read the unencrypted sensor signal.

As discussed above, a computing device (e.g., a smartphone, a smart thermostat, a smart speaker, etc.) may collect various sensor data as the device operates. For example, a smart thermostat may periodically record/collect temperature readings. In another example, a smart speaker may record audio data. The computing devices may include a smart edge module (e.g., smart edge module 140 illustrated in FIG. 1) and/or a sensor co-processor to help ensure that the sensor data is encrypted before the sensor provides the sensor data to other components (e.g., encrypted as soon as the sensor data is generated and before providing the sensor data to a main processor). This encrypted data may be transmitted to other computing devices (e.g., other server computers) or cloud service providers for storage in encrypted form.

Although encrypting the data may protect the data, it may be useful to allow certain applications to perform operations, analyses, etc., on the encrypted data (e.g., sensor data) to generate inferences, predictions, outputs, etc. For example, it may be useful for an artificial intelligence model to analyze temperature data to generate inferences about how to use a central heating/cooling system of a house more efficiently. However, providing unfettered access to the data may allow entities to use the data for purposes outside the scope under which the data was original collected. The examples, embodiments, implementations, etc., described below (e.g., secure edge modules and/or smart contracts) may allow users and/or entities to control which applications have access to the data and how the data is used by the applications (e.g., what types of inferences may be generated), as discussed in more detail below. For example, once sensor data is encrypted by a device that has a smart edge module, a secure edge module (which is separate from the smart edge module) may identify/authenticate applications that wish to use the encrypted data. The secure edge module may decrypt the encrypted data within the secure edge module and allow applications to execute within the secure edge module to access the decrypted data. The secure edge module may also allow to applications to use the encrypted data for approved purposes.

FIG. 11 illustrates an example system architecture 1100 according to one or more embodiments of the present disclosure. The system architecture 1100 includes secure edge modules 1110, an encrypted smart contract 1120, a blockchain 1130, and an encrypted log 1140. Each of the components, modules, portions, etc., of the system architecture 1100 may be interconnected via one or more networks. The system architecture 1100 may provide for the access, management, and/or control of data (e.g., sensor data, private/sensitive data such as health data, etc.). For example, the system architecture 1100 may allow for stakeholders (e.g., entities who own and/or have control of the data) to control who can access data and how data can be used. The system architecture 1100 may also allow stakeholders to delegate (e.g., transfer) control over data to other stakeholders. The system architecture 1100 may also allow stakeholders to authenticate/identify applications, and manage/control the actions, operations, functions, etc., performed by various applications (e.g., program, machine learning models, artificial intelligence models, etc.). For example, the system architecture 1100 may allow an authorized artificial intelligence model to generate one or more inferences using a set of data (e.g., GPS data, sensor data, biometric data, etc.) but may not allow another artificial intelligence model (e.g., an unauthorized artificial intelligence model) to use the set of data.

The control and/or management of the data and/or applications may be referred to as digital rights management. In one embodiment, the management and/or control of the data and/or applications (e.g., digital rights management) may be defined in encrypted smart contract 1120. The encrypted smart contract 1120 may be referred to as a contract, agreement, etc. The encrypted smart contract 1120 may include one or more documents, files, and/or data that may indicate one or more permissions (e.g., read, write, modify, how long access has been granted, etc.) for the data and/or applications.

In one embodiment a secure edge module 1110 may be a secure environment (e.g., one or more computing devices) that is trusted to control/manage access to different sets of data (e.g., sensitive, private, personal, etc., data). The secure edge module 1110 may identify/authenticate applications that may perform operations on the data (e.g., generate inferences, predictions, etc., based on the data) based on the smart contract 1120, as discussed in more detail below. The secure edge module 1110 may also allow applications to perform certain, authorized operations on the data. For example, the secure edge module 1110 may allow the applications to execute within the secure edge module 1110 using data that is decrypted within the secure edge module 1110. This may prevent unencrypted data from being accessed outside of the secure/authorized environment provided by the secure edge module 1110. The data that is used by the various applications may remain encrypted unless it is stored/located within a secure edge module 1110 or an approved environment, as discussed in more detail below. The operation of the secure edge modules 1110 is discussed in more detail below.

In some embodiments, the encrypted smart contract 1120 (and the smart contract once it has been decrypted) may indicate various information that is associated with one or more secure edge modules 1110. For example, the encrypted smart contract 1120 may indicate the configuration (e.g., hardware such as processing devices or memory, software such as operating system version or libraries, identifiers, such names or serial numbers, etc.) of a secure edge module 1110. This may allow a stakeholder to control the environment and/or type of secure edge module 1110 where data may be stored and/or applications may execute. The encrypted smart contract 1120 may also identify sets, groups, collections, etc., of data and/or metadata whose permissions are governed by the encrypted smart contract 1120. For example, the smart contract 1120 may indicate sets of data, where the sets of data are located, and different permissions that may be allowed for the sets of data (e.g., read only, read and write, time limits on the permissions, etc.). The encrypted smart contract 1120 may further indicate how the data and/or metadata can be used by different applications. For example, the encrypted smart contract 1120 may indicate that certain types of inferences (e.g., determining an age or gender of a user) may be generated by an artificial intelligence application based on one or more sets of data but other types of inferences (e.g., determining a sexual orientation of a user) are not allowed. The encrypted smart contract 1120 may also identify the applications that are allowed to execute or operate within the secure edge module 1120. For example, the encrypted smart contract 1120 may include a hash, serial number, or other identifiers for an application.

The encrypted smart contract 1120 may be an agreement between two stakeholders (e.g., two entities, computing devices, users, etc.). The encrypted smart contract 1120 may have a primary stakeholder who has overall responsibility, control, management, etc., for the encrypted smart contract 1120. The primary stakeholder may transfer or delegate some or all of their rights, permissions, access, etc., to a new stakeholder. For example, the primary stakeholder may transfer read-only access to a set of data to a second stakeholder. In another example, the primary stakeholder may share full rights/permissions to data with the secondary stakeholder. In a further example, a primary stakeholder may transfer complete ownership of the smart contract 1120 to a second stakeholder and the second stakeholder would be designated the new primary stakeholder. A stakeholder may reject or refuse to participate in a smart contract. For example, if a primary stake holder wants to grant a secondary stakeholder permission to access a set of data, the secondary stakeholder may reject the permissions/rights to access the set of data. The encrypted smart contract 1120 may further indicate whether the rights/permissions delegated/transferred to a new stakeholder are in turn transferrable by the new stakeholders. For example, a stakeholder may delegate or allow a new stakeholder read only access to a set of data but may indicate in the encrypted smart contract 1120 that the new stakeholder cannot transfer/delegate the read only access to other stakeholders. The encrypted smart contract 1120 may also include a chain of transfers/delegations between stakeholders starting from when the encrypted smart contract 1120 was created. This may be similar to a chain of title and allows the delegation/transfer of rights, permissions, etc., to be tracked.

As discussed herein, a smart contract may be included in a computing device of a user (e.g., a smart speaker, a smart phone, a smart watch, etc.). The smart contract may grant rights/permission to data, to the user of the device and/or may also grant some or all of those rights to a manufacturer of the device. In one embodiment, the smart contract on the device may be updated as additional stakeholders are granted rights/permissions. In another embodiment, a new smart contract may be created to grant rights/permissions to new stakeholders and the new smart contract may refer to a previous/existing smart contract. For example, a smart watch may have a first smart contract that grants the user of the smart watch with complete ownership of the sensor data (e.g., heart rate, blood pressure, etc.) generated by the smart watch. The user may be willing to share their sensor data with a health/fitness application to improve their workouts and/or health. In one example, the first smart contract on the smart watch may be modified to indicate that the health/fitness application has been granted access/permission to the data. In another example, a second smart contract may be created which refers to the first smart contract (e.g., includes a storage location and a hash/fingerprint of the first smart contract) and the second smart contract may indicate that the health/fitness application has been granted access/permission to the data. The first smart contract (e.g., the smart contracts on the computing devices that generate the sensor data) may be referred to as a root smart contract that provides the origin of the permissions/rights which may be delegated wholly and/or in part to other stakeholders.

In one embodiment, the encrypted smart contract 1120 may remain encrypted when the encrypted smart contract 1120 is not stored, located, etc., in a secure edge module 1110. For example, the encrypted smart contract 1120 may be stored in a storage location outside of a secure edge module 1110 (e.g., a server computer, a cloud service, etc.). A smart contract may be encrypted to generate or create an encrypted smart contract 1120. Encrypting the smart contract may prevent unauthorized access to the encrypted smart contract 1120. For example, encrypting the smart contract may prevent an unauthorized or malicious user from modifying or tampering with the smart contract (e.g., from adding permissions or rights that were not approved by a stakeholder). In another example, encrypting the smart contract may prevent an unauthorized or malicious user from reading data in the smart contract to determine which applications have permissions to which sets of data.

Each of the secure edge modules 1110 may be one or more computing devices. For example, a secure edge module 1110 may be one or more server computers, rack mount servers, workstations, etc. Each of the secure edge modules 1110 may also include one or more networks (e.g., local area networks, wireless networks, cellular networks, etc.). Each of the secure edge modules 1110 may also include data stores (e.g., data storage devices, hard disk drives, flash disk drives, flash memory, etc.). In one embodiment, the secure edge modules 1110 may be security hardened devices and/or environments that may control the boundary/interface between secured and unsecured environments. For example, the secure edge modules 1110 may control, manage, etc., access to data that is generated by digital/computing devices (e.g., smart phones, sensors such as smart thermostats, etc.). A secure edge module 1110 may allow approved applications (e.g., artificial intelligence models, data mining application, etc., indicated or specified in the smart contract 1120) to execute within the secure edge module 1110 and may allow access to data within the secure edge module 1110 (e.g., only within the secured environments). The secure edge modules 1110 may also be responsible for digital rights management and enforcing digital rights management. For example, the secure edge modules 1110 may be responsible for preventing applications from accessing or using data that has not been previously authorized (e.g., via smart contract 1120).

In one embodiment, the blockchain 1130 may be a system that includes a ledger (e.g., a distributed ledger) that is distributed across multiple nodes (e.g., multiple computing devices). Each node may include a copy of the ledger. The blockchain system 1130 may use a consensus or majority agreement mechanism to maintain the ledger across the various nodes. In one embodiment, the blockchain 1130 may be an unpermissioned or public blockchain. For example, any user/computing device may be allowed to add a node to the blockchain system in an unpermissioned or public blockchain. In another embodiment, the blockchain 1130 may be a permissioned or private blockchain system. A permissioned or private blockchain may be a blockchain system where the nodes are authenticated or given permission to be included in the blockchain system. Although the present disclosure may refer to a blockchain, other systems for storing data (e.g., other database systems) may be used in other embodiments.

In one embodiment, the blockchain 1130 may be used to store data indicating various events, operations, actions, etc., that occur within the system architecture 1100 (e.g., various events, operations, actions, etc., may be logged to the blockchain 1130). For example, the blockchain 1130 may record any modifications of the smart contract 1120 to an entry in the blockchain. In another example, actions or operations performed by an application (e.g., an artificial intelligence model) may be logged to the blockchain 1130. In a further example, the granting/revocation of permissions/rights to different sets of data may also be logged to the blockchain 1130.

In one embodiment, an entry in the blockchain 1130 may include a pointer to, a link to, and/or a location of an encrypted log 1140. The encrypted log 1140 may store the data indicating the various events, operations, actions, etc., that occur within the system architecture 1100. For example, the encrypted log 1140 may include identifiers, names, etc., of a new stakeholder who was granted rights/permissions, and a list of the rights/permissions. The entry may also include a hash of the encrypted log 1140 (or a hash of the encrypted log 1140 after it has been decrypted). This may allow another computing device to verify that the encrypted log 1140 (or log file after the encrypted log 1140 is decrypted) has not been modified or tampered with. For example, another computing device may generate a hash of the log file (after it has been decrypted) and may compare the hash with the hash that is in the entry on the blockchain 1130. Matching hashes indicate that the log file has not been tampered with and mismatching hashes indicate that the log file has been tampered with.

Figure 12:
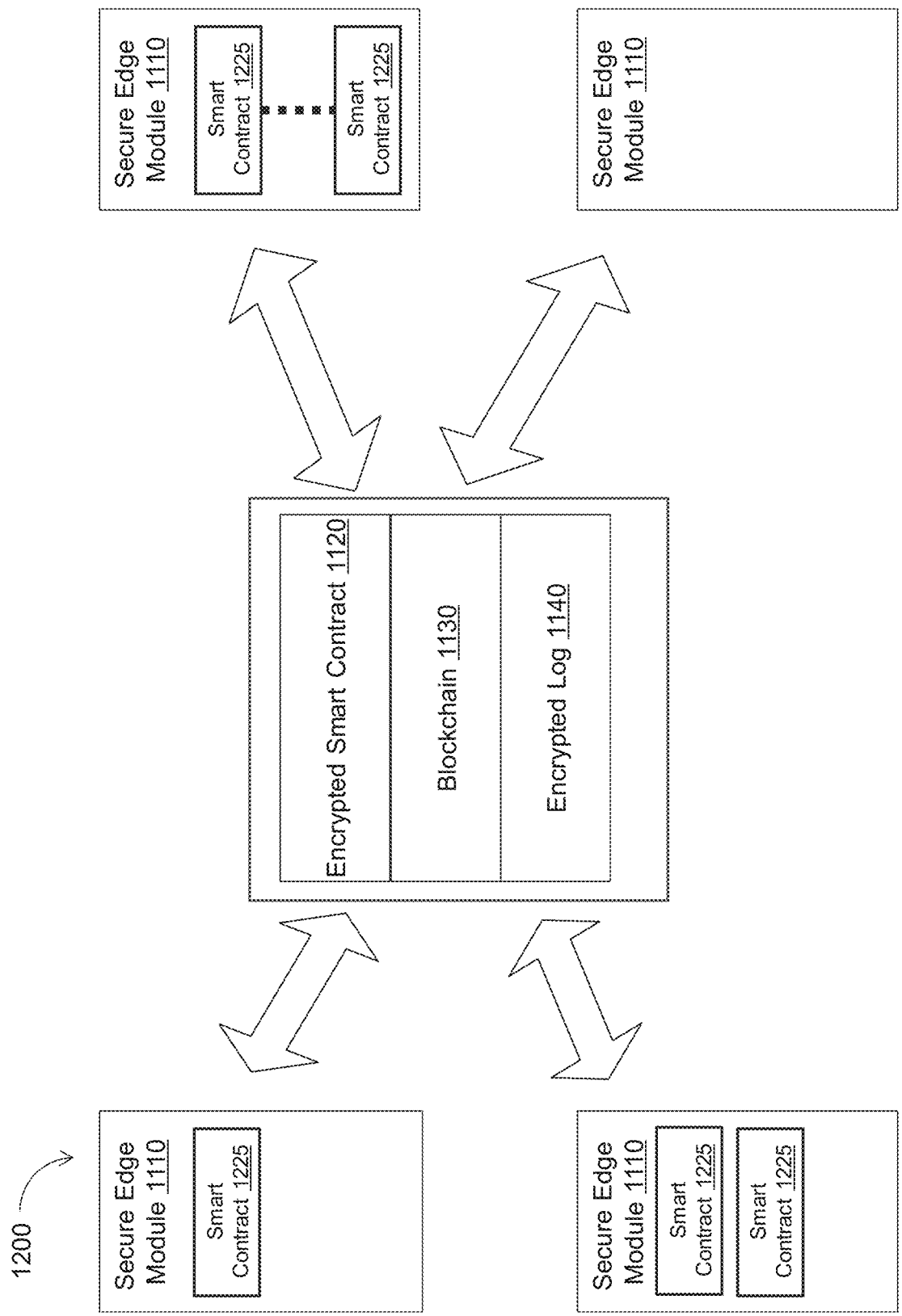
FIG. 12 illustrates an example system architecture according to one or more embodiments of the present disclosure.

FIG. 12 illustrates an example system architecture 1200 according to one or more embodiments. The system architecture 1200 includes secure edge modules 1110, an encrypted smart contract 1120, a blockchain 1130, and an encrypted log 1140. The system architecture 1200 may provide for the access, management, and/or control of data, as discussed above. The system architecture 1200 may also allow stakeholders to delegate/transfer control over data to other stakeholders. The system architecture 1200 may also allow stakeholders to manage and/or control the actions, operations, functions, etc., performed by various applications.

Each of the secure edge modules 1110 may be one or more computing devices. Each of the secure edge modules 1110 may also include one or more networks and/or data stores. In one embodiment, the secure edge modules 1110 may be security hardened devices and/or environments that may control the boundary/interface between secured and unsecured environments. The secure edge modules 1110 may also be responsible for digital rights management and enforcing digital rights management. The secure edge module 1110 may identify/authenticate applications that may perform operations on the data (e.g., generate inferences, predictions, etc., based on the data) based on the smart contract 1120. The secure edge module 1110 may also allow applications to execute within the secure edge module 1110 using data that is decrypted within the secure edge module 1110. This may prevent unencrypted data from being accessed outside of the secure/authorized environment provided by the secure edge module 1110.

In one embodiment, the blockchain 1130 may be a system that includes a ledger that is distributed across multiple nodes. The blockchain 1130 may be an unpermissioned/public blockchain or a permissioned/private blockchain, as discussed above. The blockchain 1130 may be used to store data indicating various events, operations, actions, etc., that occur within the system architecture 1200. An entry in the blockchain 1130 may include a pointer to, a link to, and/or a location of an encrypted log 1140. The encrypted log 1140 may store the data indicating the various events, operations, actions, etc., that occur within the system architecture 1200. The entry may also include a hash of the encrypted log 1140 (or a hash of the encrypted log 1140 after it has been decrypted) to allow for verification of the encrypted log file 1140.

As discussed above, the management and/or control of the data and/or applications (e.g., digital rights management) may be defined in encrypted smart contract 1120. The encrypted smart contract 1120 may also indicate configuration information, whether rights/permissions can be delegated, and the types of inferences that may be generated. The encrypted smart contract 1120 may have a primary stakeholder who has overall responsibility, control, management, etc., for the encrypted smart contract 1120. The primary stakeholder may transfer some or all of their rights, permissions, access, etc., to a new stakeholder.

As discussed above, the encrypted smart contract 1120 may remain encrypted when the encrypted smart contract 1120 is not stored, located, etc., in a secure edge module 1110. Encrypting the smart contract may prevent unauthorized access to the encrypted smart contract 1120. Some of the secure edge modules 1110 may include one or more smart contracts 1225. For example, the top left secure edge module 1110 includes one smart contract 1225. In another example, the bottom left secure edge module 1110 includes two smart contracts 1225. The smart contracts 1225 are decrypted or unencrypted smart contracts. For example, encrypted smart contract 1120 may be decrypted to generate or obtain smart contract 1225. Because the secure edge modules 1110 may be trusted or authorized environments for storing data (e.g., private/sensitive data) and/or executing authorized applications, the smart contracts 1225 may be stored unencrypted within the secure edge module 1110.

Each secure edge module 1110 may include/store varying numbers of smart contracts 1225. Each smart contract 1225 may be associated with different sets of data that are stored on a respective secure edge module 1110. Each smart contract 1225 may also be associated with different applications (e.g., machine learning models) that are authorized to execute within the respective secure edge module 1110. Thus, a secure edge module 1110 may be able to manage and/or control operations performed by various applications and access to various sets of data.

In one embodiment, a secure edge module 1110 may be configured to only allow operations, functions, access, and/or permissions that are indicated by a smart contract. For example, the operating system, libraries, drivers, supporting applications, processing devices (e.g., FPGA, ASIC, processor, etc.) of the secure edge module 1110 may be programmed and/or configured to prevent operations, functions, accesses, etc., that are not indicated by the smart contract 1225. The operating system, libraries, drivers, supporting applications, processing devices of the secure edge module 1110 may also be programmed and/or configured to allow only the operations, functions, accesses, that are indicated in smart contracts 1225 located on the secure edge module 1110. This configuration of the secure edge module 1110 may allow the system architecture 1200 to help ensure that access to data and the operations, functions, actions, etc., of applications are tightly controlled by smart contracts 1225. This configuration of the secure edge module 1110 may also allow the system architecture 1200 to help ensure that the secure edge module 1110 refrains from performing operations that are not indicated in the smart contracts 1225, refrains from executing applications that are not indicated in the smart contracts 1225, and/or refrains from allowing access to data that is not indicated in the smart contracts 1225.

Figure 13:
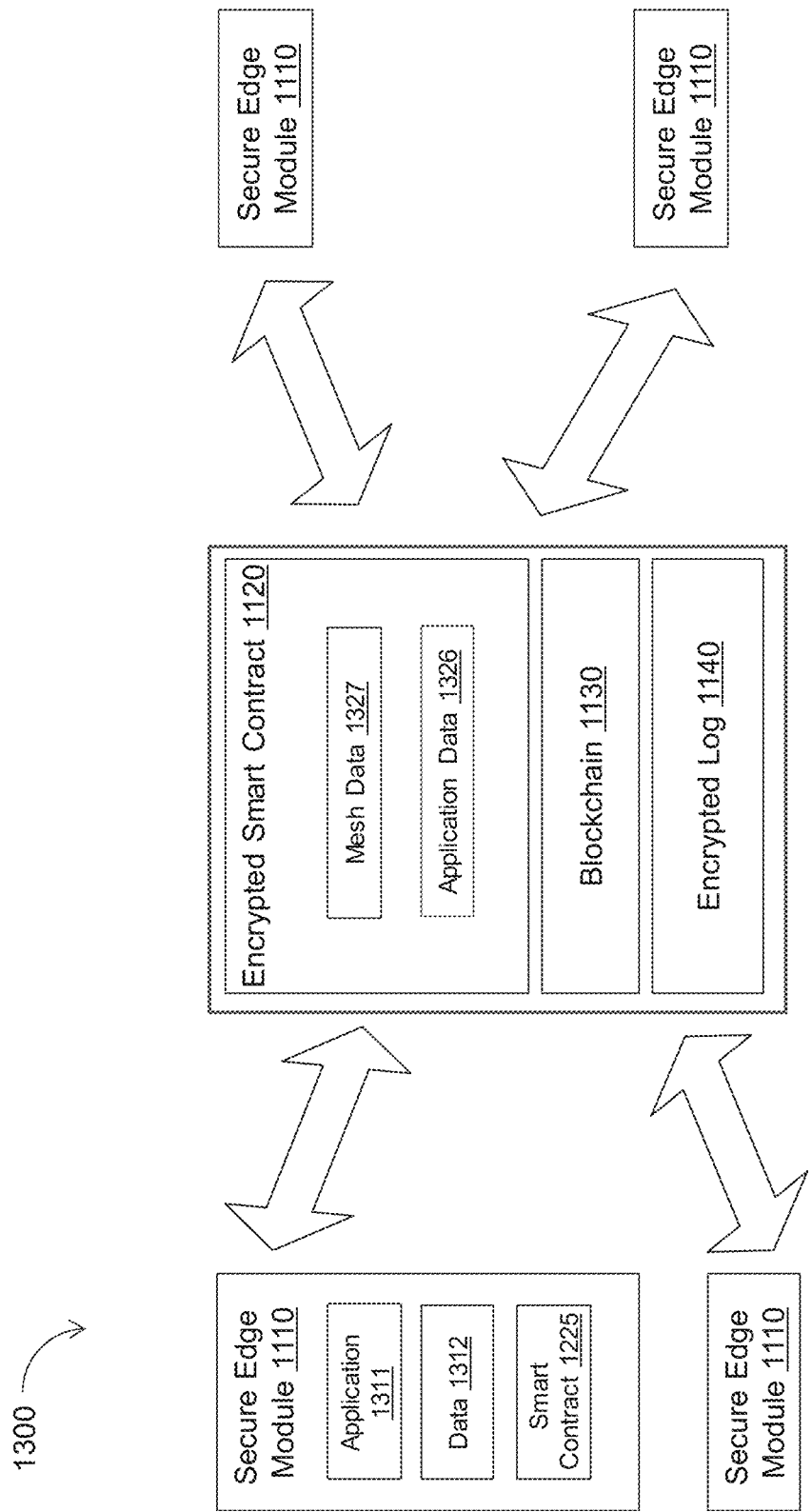
FIG. 13 illustrates an example system architecture according to one or more embodiments of the present disclosure.

FIG. 13 illustrates an example system architecture 1300 according to one or more embodiments. The system architecture 1300 includes secure edge modules 1110, an encrypted smart contract 1120, a blockchain 1130, and an encrypted log 1140. The system architecture 1300 may provide for the access, management, and/or control of data, as discussed above. The system architecture 1300 may also allow stakeholders to delegate/transfer control over data to other stakeholders. The system architecture 1300 may also allow stakeholders to manage and/or control the actions, operations, functions, etc., performed by various applications.

Each of the secure edge modules 1110 may be one or more computing devices. Each of the secure edge modules 1110 may also include one or more networks and/or data stores. In one embodiment, the secure edge modules 1110 may be security hardened devices and/or environments that may control the boundary/interface between secured and unsecured environments. The secure edge modules 1110 may also be responsible for digital rights management and enforcing digital rights management. The secure edge module 1110 may identify/authenticate applications that may perform operations on the data (e.g., generate inferences, predictions, etc., based on the data) based on the smart contract 1120. The secure edge module 1110 may also allow applications to execute within the secure edge module 1110 using data that is decrypted within the secure edge module 1110. This may prevent unencrypted data from being accessed outside of the secure/authorized environment provided by the secure edge module 1110.

In one embodiment, the blockchain 1130 may be a system that includes a ledger that is distributed across multiple nodes. The blockchain 1130 may be an unpermissioned/public blockchain or a permissioned/private blockchain, as discussed above. The blockchain 1130 may be used to store data indicating various events, operations, actions, etc., that occur within the system architecture 1300 (e.g., various events, operations, actions, etc., may be logged to the blockchain 1130). An entry in the blockchain 1130 may include a pointer to, a link to, and/or a location of an encrypted log 1140. The encrypted log 1140 may store the data indicating the various events, operations, actions, etc., that occur within the system architecture 1300.

As discussed above, the management and/or control of the data and/or applications may be defined in encrypted smart contract 1120. The encrypted smart contract 1120 may include one or more documents, files, and/or data that may indicate one or more permissions for the data and/or applications. The encrypted smart contract 1120 may also indicate configuration information, whether rights/permissions can be delegated, and the types of inferences that may be generated. The encrypted smart contract 1120 may have a primary stakeholder who has overall responsibility, control, management, etc., for the encrypted smart contract 1120. The primary stakeholder may transfer some or all of their rights, permissions, access, etc., to a new stakeholder.

As discussed above, the encrypted smart contract 1120 may remain encrypted when the encrypted smart contract 1120 is not stored, located, etc., in a secure edge module 1110. Encrypting the smart contract may prevent unauthorized access to the encrypted smart contract 1120. Some of the secure edge modules 1110 may include one or more smart contracts 1225. Because the secure edge modules 1110 may be trusted or authorized environments for storing data (e.g., private/sensitive data) and/or executing authorized applications, the smart contracts 1225 may be stored unencrypted within the secure edge module 1110. Each smart contract 1225 may be associated with different sets of data that are stored on a respective secure edge module 1110. Each smart contract 1225 may also be associated with different applications (e.g., machine learning models) that are authorized to execute within the respective secure edge module 1110. Thus, a secure edge module 1110 may be able to manage and/or control operations performed by various applications and access to various sets of data.

In one embodiment, a secure edge module 1110 may be configured to only allow operations, functions, access, and/or permissions that are indicated by a smart contract. The operating system, libraries, drivers, supporting applications, processing devices of the secure edge module 1110 may also be programmed and/or configured to allow only the operations, functions, accesses, that are indicated in smart contract 1225 located on the secure edge module 1110. This configuration of the secure edge module 1110 may allow the system architecture 1300 to help ensure that access to data and the operations, functions, actions, etc., of applications are tightly controlled by smart contracts 1225.

As illustrated in FIG. 13, the top left secure edge module 1110 includes an application 1311, data 1312, and smart contract 1225. In one embodiment, the smart contract 1225 may be associated with one or more of the application 1311, the data 1312, and/or the secure edge module 1110. For example, the smart contract 1225 may indicate and/or identify the secure edge module 1110 (e.g., may include a name/identifier for the secure edge module 1110, may include configuration information for the secure edge module 1110, etc.). In another example, the smart contract 1225 may include a hash of the data 1312 which may be used to identify the data 1312 and prevent tampering with the data 1312. In a further example, the smart contract 1225 may include a hash of the application 1311, a serial number of the application 1311, some other information that may be used to identify the application 1311, etc. The smart contract 1225 may also indicate the types of operations that the application 1311 may perform (e.g., the types of inferences the application 1311 can generate) and the permissions for the data 1312 (e.g., read access for a certain period of time). The encrypted smart contract 1225 allows the secure edge module 1110 to authenticate/identify application 1311 and determine whether the application 1311 has permission to execute (e.g., generate inferences) using the data 1312. If the application 1311 has permission to access the data and/or to generate inferences, the secure edge module 1110 may execute the application 1311 and/or may cause the application 1311 to execute on or using the set of data, as discussed in more detail below. If the application 1311 does not have permission to access the data and/or to generate inferences, the secure edge module 1110 may refrain from executing the application 1311 (e.g., may prevent the application 1311 from executing). The data 1312 may be decrypted data because the secure edge module 1110 is a secure environment where data is allowed to be stored unencrypted. Based on the contract, the data 1312 may be deleted after the application 1311 operates on the data 1312, as discussed in more detail below.

In one embodiment, the secure edge module 1110 may perform various post processing operations after the application 1311 operates on the data 1312. For example, the secure edge module 1110 may determine whether the data 1312 should be deleted or should remain on the secure edge module 1110 based on the smart contract 1225. If the smart contract 1225 indicates that the data 1312 should be deleted after a period of time or after the application 1311 is done using the data 1312, the secure edge module 1110 may delete the data 1312. In another example, the secure edge module 1110 may delete the application 1311 after a period of time or may allow the application 1311 to remain on the secure edge module 1110, based on what is indicated in the smart contract 1225. In a further example, the secure edge module 1110 may encrypt the data 1312 and transmit the encrypted data to another device, or may encrypt the output/inferences and transmit the encrypted output/inferences to another device, based on what is indicated in the smart contract 1225.

In one embodiment, the application 1311 may include one or more of a digital signature (which may also be used to verify the application 1311), a hash of the application 1311, a human readable definition of the purpose of the application (e.g., the types of inferences/outputs generated by the application). In one embodiment, the application 1311 may include one or more of a digital signature (which may also be used to verify the application 1311), a hash of the application 1311, a human readable definition of the purpose, inputs, and outputs of the application 1311, and a hash of the human readable definition. This information may also be included in the smart contract 1255 to allow the secure edge module 1110 to insure there is clear agreement on what inferences are allowed access to the data 1312 and under what conditions. Thus information may also be used to audit or check the application 1311. For example, the application 1311 may be periodically checked by an entity (e.g., an independent auditor) to verify that the types of inferences generated by the application 1311 are the same as the information in the human readable definition. If an application performs operations (e.g., generates inferences) different than what is indicated in the human readable definition, various penalties may be applied to the entity (e.g., a company, a corporation, a user, etc.) that created and/or controls the application. For example, all applications created by the entity may be prevented from executing on the secure edge module 1110 (e.g., may be barred from using the secure edge module 1110).

The encrypted smart contract 1120 (and thus the decrypted smart contract 1225) includes mesh data 1327. The mesh data 1327 may be data that may be used to identify other secure edge modules 1110 that are in the system architecture 1300. For example, all of the secure edge modules 1110 may form a mesh or a neighborhood. The mesh data 1327 may allow the secure edge module 1110 to determine whether the secure edge module 1110 is in the appropriate environment. This may help prevent a malicious user from using a stolen secure edge module 1110. For example, if a user is able to obtain an old or stolen secure edge module, the secure edge module may not execute applications without verifying the mesh or neighborhood of other secure edge modules. The process of identifying other secure edge modules 1110 may be a peer-based process. For example, the process of identifying other secure edge modules 1110 may occur between the secure edge modules 1110. The process of identifying other secure edge modules 1110 may be referred to as mesh identification, neighbor identification, neighborhood identification, etc.

In one embodiment, a secure edge module 1110 may monitor and/or log the configuration and/or behavior of other secure edge modules 1110. For example, a first secure edge module 1110 may monitor the packets, messages, etc., transmitted by other secure edge modules 1110. In another example, the secure edge module 1110 may monitor the operating system version, hardware, software libraries, applications that are installed or executing, etc., that are used on other secure edge modules 1110. The secure edge module 1110 may log information about the configuration and/or behavior of other secure edge modules 1110 in an internal log or on the blockchain 1130. The mesh data 1327 may include the information/data that a secure edge module 1110 may use to identify other secure edge module 1110 (e.g., neighbors). For example, the mesh data 1327 may include IP addresses, identifiers, names, serial numbers, configurations, physical locations, etc., of the other secure edge modules in the system architecture 1300. The mesh data 1327 may also identify networks (e.g., wireless networks) and/or other computing devices that the secure edge module 1110 should be able to communicate with (e.g., should be accessible or visible to the secure edge module 1110). If the secure edge module 1110 determines that the behavior/configuration of the other secure edge modules 1110 matches the mesh data 1327 and/or that the secure edge module 1110 can communicate with other secure edge modules 1110, the secure edge module 1110 may allow applications to generate inferences and/or perform other actions. If the secure edge module 1110 determines that the behavior/configuration of the other secure edge modules 1110 does not match the mesh data 1327 and/or that the secure edge module 1110 cannot communicate with other secure edge modules 1110, the secure edge module 1110 may prevent and/or refrain from allowing applications to generate inferences and/or perform other actions.

In one embodiment, the secure edge module 1110 may authenticate and/or verify the application 1311 before allowing the application 1311 to execute (e.g., to generate inferences) and/or access the data 1312. The secure edge module 1110 may use various methods, techniques, operations, etc., to authentication and/or verify the application 1311. For example, the secure edge module 1110 may generate a hash (e.g., a fingerprint) of the application 1311 and determine whether the hash matches a second hash (e.g., a second fingerprint) in the smart contract 1225. In another example, the secure edge module 1110 may determine whether an identifier, serial number, etc., matches an identifier, serial numbers, etc., in the smart contract 1225.

In one embodiment, the smart contract 1225 may also indicate permissions/rights to the transformations/modifications to the data 1312 are allowed and whether the results of the operations of the application 1311 (e.g., the inferences generated by the application 1311). For example, the smart contract 1225 (and/or the encrypted smart contract 1220) may indicate that an application is allowed to train application 1311 (e.g., an artificial intelligence model) using the data 1312 but is not able to store the inferences/output generated by the application 1311. In a further example, the smart contract 1225 may allow the application 1311 to modify the data 1312 while on the secure edge module 1110 but may not allow the application 1311 to retain the modified data. The smart contract 1225 may also indicate how the data and/or inferences/output should be stored. For example, if the smart contract 1225 allows a user or the application 1311 to retain a copy of the data, the smart contract 1225 may indicate that the data 1312 is to remain encrypted unless the data 1312 is within a secure environment.

Figure 14:
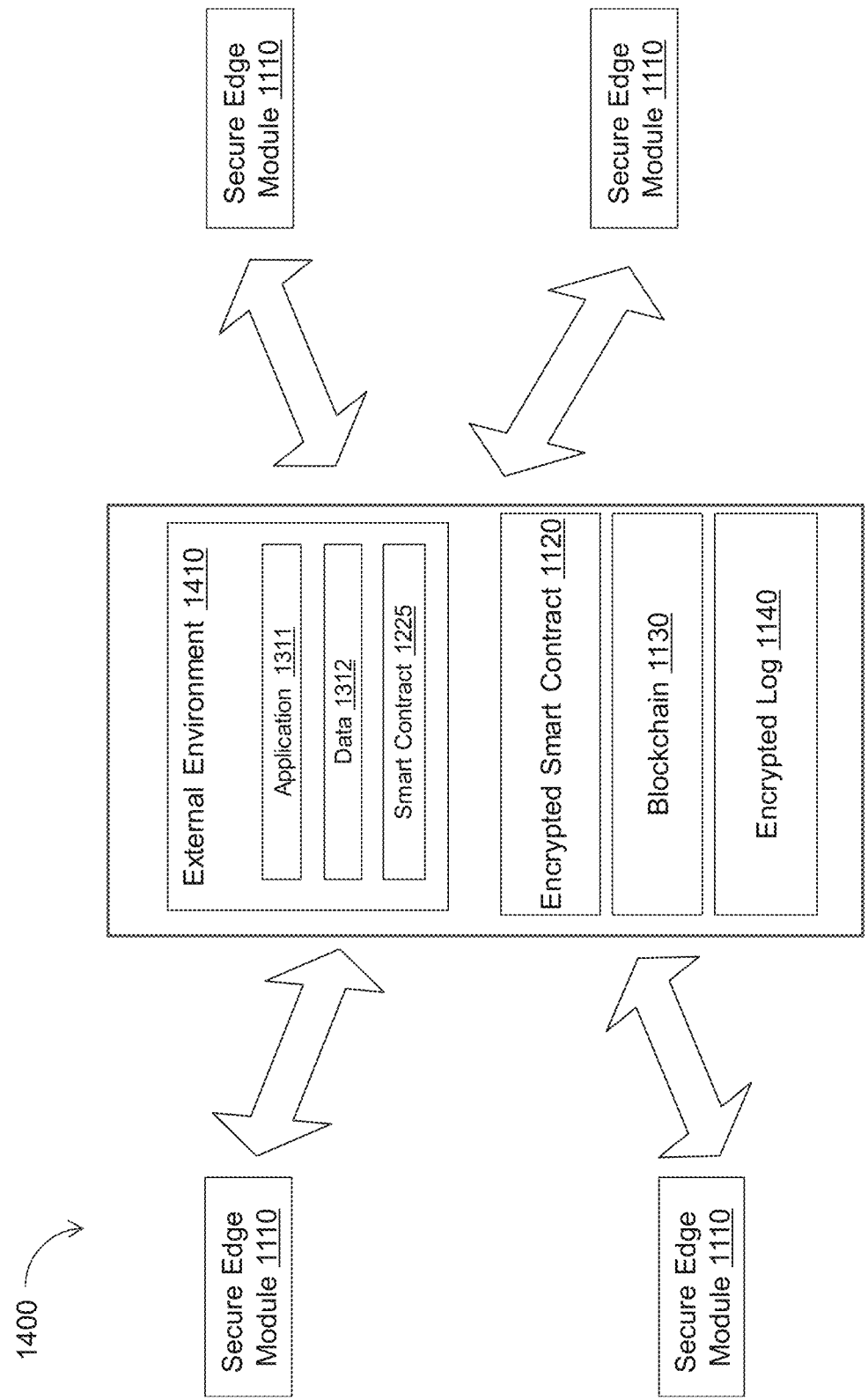
FIG. 14 illustrates an example system architecture according to one or more embodiments of the present disclosure.

FIG. 14 is a block diagram of a system architecture 1400 in accordance with one or more embodiments of the present disclosure. The system architecture 1400 includes secure edge modules 1110, an external environment 1410, an encrypted smart contract 1120, a blockchain 1130, and an encrypted log 1140. The system architecture 1400 may provide for the access, management, and/or control of data, as discussed above. The system architecture 1400 may also allow stakeholders to delegate/transfer control over data to other stakeholders. The system architecture 1400 may also allow stakeholders to manage and/or control the actions, operations, functions, etc., performed by various applications.

Each of the secure edge modules 1110 may be one or more computing devices. Each of the secure edge modules 1110 may also include one or more networks and/or data stores. In one embodiment, the secure edge modules 1110 may be security hardened devices and/or environments that may control the boundary/interface between secured and unsecured environments. The secure edge modules 1110 may also be responsible for digital rights management and enforcing digital rights management. In one embodiment, the applications may not execute within the secure edge modules 1110 and the data may not be decrypted within the secure edge modules 1110. Instead, the applications may execute within the external environment 1410 and the data may be decrypted within the external environment. The secure edge module 1110 may be responsible for authenticating/identifying applications and determining whether applications have access to data. The secure edge module 1110 may instruct the external environment 1410 to allow the applications to execute and/or access data based on the smart contract 1225, as discussed in more detail below.

In one embodiment, the blockchain 1130 may be a system that includes a ledger that is distributed across multiple nodes. The blockchain 1130 may be an unpermissioned/public blockchain or a permissioned/private blockchain, as discussed above. The blockchain 1130 may be used to store data indicating various events, operations, actions, etc., that occur within the system architecture 1400 (e.g., various events, operations, actions, etc., may be logged to the blockchain 1130). An entry in the blockchain 1130 may include a pointer to, a link to, and/or a location of an encrypted log 1140. The encrypted log 1140 may store the data indicating the various events, operations, actions, etc., that occur within the system architecture 1400.

As discussed above, the management and/or control of the data and/or applications (e.g., digital rights management) may be defined in encrypted smart contract 1120. The encrypted smart contract 1120 may include one or more documents, files, and/or data that may indicate one or more permissions for the data and/or applications. The encrypted smart contract 1120 may also indicate configuration information, whether rights/permissions can be delegated, and the types of inferences that may be generated. The encrypted smart contract 1120 may have a primary stakeholder who has overall responsibility, control, management, etc., for the encrypted smart contract 1120. The primary stakeholder may transfer some or all of their rights, permissions, access, etc., to a new stakeholder. As discussed above, the encrypted smart contract 1120 may remain encrypted when the encrypted smart contract 1120 is not stored, located, etc., in a secure edge module 1110. Encrypting the smart contract may prevent unauthorized access to the encrypted smart contract 1120.

In one embodiment, the external environment 1410 may be a computing environment that is separate from the secure edge modules 1110. The external environment 1410 may be an environment that is trusted by the stakeholders of the system architecture 1400 to access data and/or execute applications based on the rights/permission specified in the smart contract 1225. The external environment 1410 may be referred as a trusted or semi-secure environment. The external environment 1410 may be verified, vetted, etc., by the stakeholders as an acceptable environment for accessing data and/or execution applications in a manner controlled/governed by the smart contact 1225. Thus, the external environment 1410 may be trusted to follow the smart contract 1225 and to prevent accesses and/or operations that are not allowed by the smart contract 1225. An example of an external environment 1410 may be a cloud computing environment (e.g., Amazon ECS, Microsoft Azure, etc.).

The external environment 1410 may be used in instances where the secure edge modules 1110 are unable to meet conditions for the data 1312 and/or the application 1311. For example, the secure edge module 1110 may not have enough storage space to store the data 1312 and/or may not have enough computing/processing power to execute the application 1311 (e.g., an artificial intelligence model).

The external environment 1410 may include one or more smart contracts 1225. The smart contract 1225 may be the unencrypted version of encrypted smart contracts 1120. Each smart contract 1225 may be associated with different sets of data that are stored on a respective secure edge module 1110. Each smart contract 1225 may also be associated with different applications (e.g., machine learning models) that are authorized to execute within the external environment 1410. Thus, an external environment 1410 may be able to manage and/or control operations performed by various applications and access to various sets of data.

In one embodiment, the external environment 1410 may be configured to only allow operations, functions, access, and/or permissions that are indicated by a smart contract. The operating system, libraries, drivers, supporting applications, processing devices may also be programmed and/or configured to allow only the operations, functions, accesses, that are indicated in smart contract 1225 located. This configuration of the external environment 1410 may allow the system architecture 1400 to help ensure that access to data and the operations, functions, actions, etc., of applications are tightly controlled by smart contracts 1225.

In one embodiment, the smart contract 1225 may be associated with one or more of the application 1311, the data 1312, and/or the external environment 1410. The smart contract 1225 may also indicate the types of operations that the application 1311 may perform (e.g., the types of inferences the application 1311 can generate) and the permissions for the data 1312 (e.g., read access for a certain period of time). The smart contract 1225 allows secure edge module 1110 to determine whether the application 1311 has permission to execute (e.g., generate inferences) using the data 1312. If the application 1311 has permission to access the data and/or to generate inferences, the secure edge module 1110 may provide the external environment 1410 with a location to download an encrypted copy of the application 1311 (e.g., via a message or a packet). The external environment 1410 may download the encrypted copy of the application 1311 and decrypt the encrypted copy. The secure edge module 1110 may cause the external environment 1410 to execute the application 1311. For example, the secure edge module 1110 may transmit a message, packet, etc., to the external environment 1410 indicating that the application 1311 is allowed to execute (e.g., generate one or more inferences/output). If the application 1311 does not have permission to access the data and/or to generate inferences, the secure edge module 1110 may refrain from causing the external environment 1410 from executing the application 1311 (e.g., may prevent the application 1311 from executing).

The external environment 1410 may perform various post processing operations after the application 1311 operates on the data 1312. For example, the external environment 1410 may determine whether the data 1312 should be deleted or should remain on the external environment 1410 based on the smart contract 1225. If the smart contract 1225 indicates that the data 1312 should be deleted after a period of time or after the application 1311 is done using the data 1312, the external environment 1410 may delete the data 1312. In another example, the external environment 1410 may delete the application 1311 after a period of time or may allow the application 1311 to remain on the external environment 1410, based on what is indicated in the smart contract 1225. In a further example, the external environment 1410 may encrypt the data 1312 and transmit the encrypted data to another device, or may encrypt the output/inferences and transmit the encrypted output/inferences to another device, based on what is indicated in the smart contract 1225.

In one embodiment, the application 1311 may include one or more of a digital signature (which may also be used to verify the application 1311), a hash of the application 1311, a human readable definition of the purpose, inputs, and outputs of the application 1311, and a hash of the human readable definition. This information may also be included in the smart contract 1255 to allow the secure edge module 1110 to help insure there is clear agreement on what inferences are allowed access to the data 1312 and under what conditions. Thus information may also be used to audit or check the application 1311.

In one embodiment, the secure edge module 1110 may authenticate and/or verify the application 1311 before allowing the application 1311 to execute (e.g., to generate inferences) and/or access the data 1312 on the external environment 1410. The secure edge module 1110 may use various methods, techniques, operations, etc., to authentication and/or verify the application 1311. For example, the secure edge module 1110 may generate a hash (e.g., a fingerprint) of the application 1311 and determine whether the hash matches a second hash (e.g., a second fingerprint) in the smart contract 1225. In another example, the secure edge module 1110 may determine whether an identifier, serial number, etc., of the application 1311 matches an identifier, serial numbers, etc., in the smart contract 1225.

In one embodiment, the secure edge module 1110 may also transmit a token or key (e.g., a temporary token or temporary key) that may be used to decrypt the data 1312 so that the application 1311 may use the data. For example, the secure edge module 1110 may retrieve the data 1312 in an encrypted form from a storage location (e.g., a server). The secure edge module 1110 may decrypt the data 1312 and then re-encrypt the data 1312 using a temporary token or key. The secure edge may send the re-encrypted data 1312 and the temporary token/key to the external environment 1410. The temporary token/key may expire after a period of time which may prevent the external environment 1410 from accessing the data 1312 after the period of time expires. The external environment 1410 may request a new temporary token/key if the period of time expires and the secure edge module 1110 may provide a new temporary token/key if allowed by the smart contract 1225.

In one embodiment, the smart contract 1225 may also indicate permissions/rights to the transformations/modifications to the data 1312 are allowed and to the results of the operations of the application 1311 (e.g., the inferences generated by the application 1311). For example, the smart contract 1225 (and/or the encrypted smart contract 1220) may indicate that an application is allowed to train application 1311 (e.g., an artificial intelligence model) using the data 1312 but is not able to store the inferences/output generated by the application 1311. In a further example, the smart contract 1225 may allow the application 1311 to modify the data 1312 while on the secure edge module 1110 but may not allow the application 1311 to retain the modified data. The smart contract 1225 may also indicate how the data and/or inferences/output should be stored. For example, if the smart contract 1225 allows a user or the application 1311 to retain a copy of the data, the smart contract 1225 may indicate that the data 1312 is to remain encrypted unless the data 1312 is within a secure environment.

In one embodiment, a secure edge module 1110 may verify an external environment 1410 (similar to verifying neighbor secure edge modules), before allowing the external environment 1410 to access data 1312 and/or execute the application 1311. For example, the secure edge module 1110 may verify one or more identifiers embedded in the application 1311. In another example, the secure edge module 1110 may verify that the operating system versions, libraries, etc., match what is in the smart contract 1225. In a further example, the secure edge module 1110 may match other configuration information of the external environment 1410 (e.g., processor ID, disk controller ID, MAC address, IP address, etc.) with what is in the smart contract 1225. In a further example, the secure edge module 1110 may ping the external environment 1410 to validate that the latency of the ping falls within a normal range. In yet another example, the secure edge module 1110 may perform a trace-route to the external environment 1410 determine whether path between the two approximates a known route. The secure edge module 1110 may also validate other devices/services, such as databases, firewalls, etc., to determine whether they match what is indicated in the smart contract 1225. The secure edge module 1110 may also validate the physical location (e.g., GPS coordinates) of the external environment 1410 (or a computing device within the external environment 1410).

Figure 15:
FIG. 15 is a block diagram illustrating an example smart contract according to one or more embodiments of the present disclosure.

FIG. 15 is a block diagram illustrating an example smart contract 1120 according to one or more embodiments of the present disclosure. The smart contract 1120 includes stakeholder data 1505, permission data 1515, encrypt keys 1520, log data 1525, application data 1530, and blockchain data 1535. As discussed above, the smart contract 1120 may include one or more documents, files, and/or data that may indicate one or more permissions (e.g., read, write, modify, how long access has been granted, etc.) for the data and/or applications. The smart contract 1120 may refer to both an encrypted smart contract or an unencrypted smart contract.

The smart contract 1120 includes stakeholder data 1505. Stakeholder data 1505 may indicate a one or more stakeholders associated with the smart contract 1120. For example, the stakeholder data 1505 may indicate a primary stakeholder and/or multiple secondary stakeholders. The stakeholder data 1505 may also indicate a record of stakeholders that are added and/or removed.

The permission data 1515 may indicate the different permissions that are allowed for different sets of data and/or for different applications. For example, the permission data 151 may indicate that a first artificial intelligence model has read permissions to a set of data.

The encryption keys 1520 may include initial keys that are granted to stakeholders for decrypting data and/or applications. The encryption keys 1520 may be updated/changed and the new encryption keys may be stored in the smart contract 1120 and/or at another location (e.g., on a secure edge module, on a server computer, etc.).

The log data 1525 may log data may include a location (e.g., a URL, an address, a link, etc.) of an encrypted log. As discussed above, the encrypted log may store the data indicating the various events, operations, actions, etc., that occur within the system architecture 1100. The encrypted log may store information about the actions, operations, and/or events related to the smart contract 1120 and/or related to applications associated with the smart contract 1120.

The application data 1530 may include information about the applications, programs, etc., that are associated with and/or controlled/governed by the smart contract 1120. For example, the application data 1530 may include a hash of an application, an identifier for the application, etc. The application data 1530 may also include configuration information for one or more smart edge modules (e.g., software/hardware configurations).

The blockchain data 1535 may include a location (e.g., a URL, an address, a link, etc.) of a blockchain that is used to store information about the actions, operations, and/or events related to the smart contract 1120 and/or related to applications associated with the smart contract 1120.

Figure 16:
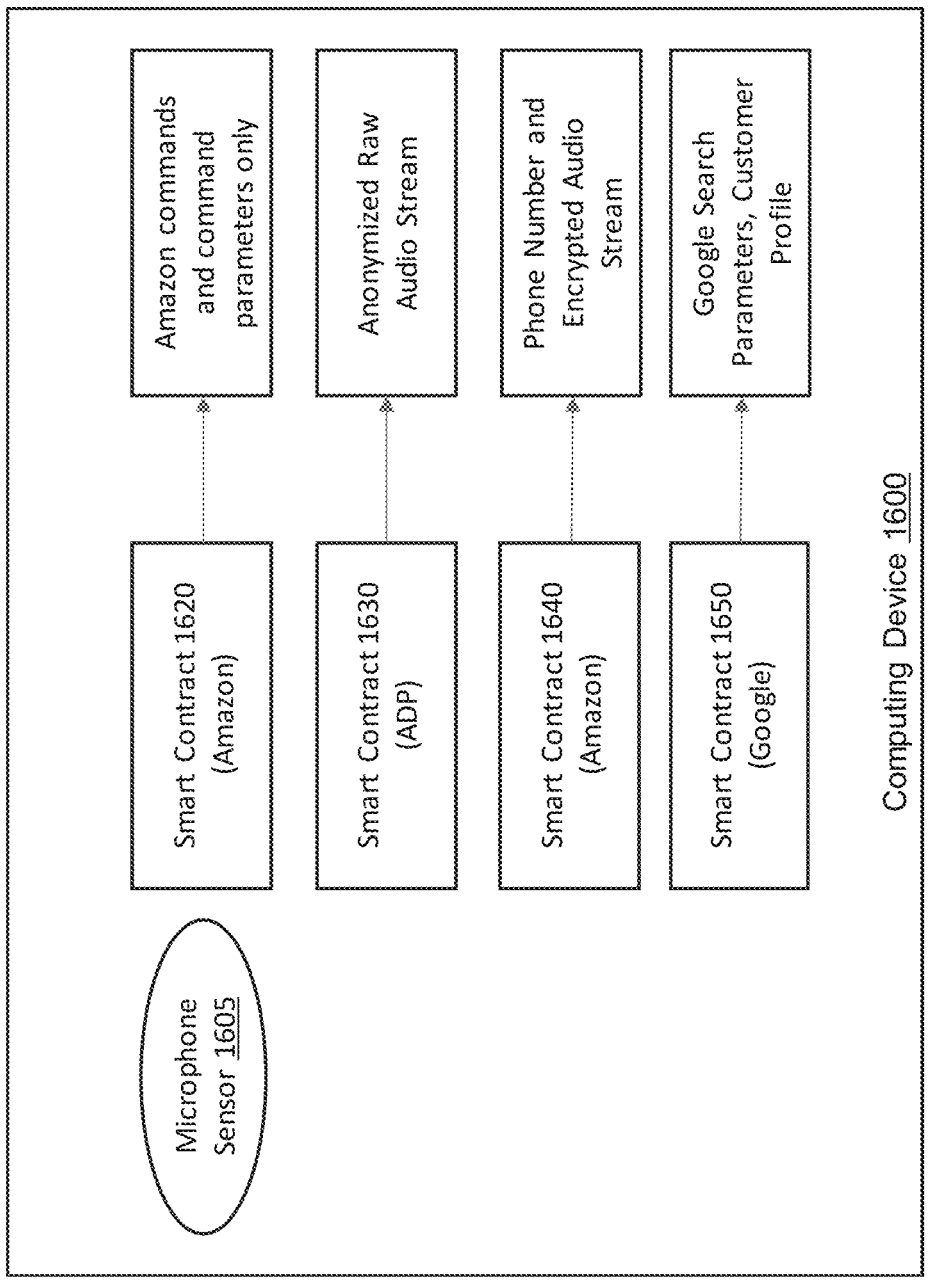
FIG. 16 is a block diagram illustrating examples smart contracts that may be associated with a computing device in accordance with one or more embodiments of the present disclosure.

FIG. 16 is a block diagram illustrating examples smart contracts that may be associated with a computing device 1600 in accordance with one or more embodiments of the present disclosure. The computing device may be a smart speaker, cellular phone, electronic device, etc., that includes a microphone sensor 1605. The computing device 1600 may include a smart edge module to encrypt and/or protect the sensor data (e.g., audio data, audio recordings, etc.) generated by the microphone sensor 1605, as discussed above in conjunction with FIGS. 1-10. The computing device 1600 includes smart contracts 1620, 1630, 1640, and 1650.

The smart contract 1620 is defined between a user of the computing device 1600 (e.g., a primary stakeholder) and Amazon. The smart contract 1620 may allow Amazon to run artificial intelligence models on the computing device 1600 which translates the audio stream into a set of commands and parameters. Only the commands and parameters are transferred to Amazon for the purpose of providing Alexa services. Amazon may not be allowed any access to the raw data stream and the inferences that are locally generated may be audited to insure compliance to the agreement.

The smart contract 1630 is a contract defined between the user and ADP (e.g., a home security service). The smart contract 1630 allows ADP to monitor the anonymized raw audio stream for the purposes of providing home security services. Monitoring personnel with access to the raw audio stream do not have access to information identifying the user. Identification information is only transferred to police if an exception event is triggered, per the smart contract 1630.

The smart contract 1640 is a contract defined between the user and Verizon. The smart contract 1640 allows Verizon access to the source phone number, destination phone number, and encrypted data stream for the purpose of providing phone service to the home owner. The smart contract 1640 specifies acceptable use by Verizon of the phone meta data, the length of time that the data can be stored and requires that metadata can only be stored in encrypted format.

The smart contract 1650 is a contract defined between the user and Google. The smart contract 1650 allows Google access to run a local artificial intelligence model that intercepts commands and parameters addressed to "GOOGLE SEARCH" and translate the audio stream in the associated search commands and parameters. Google is not provided access to the raw audio stream, per the smart contract 1650. The smart contract 1650 allows Google to identify the region and the customer income bracket and display ads. Google is not allowed to store any data that has not been fully anonymized according to an auditable process, per the smart contract 1650. Google is also not allowed to share non-anonymized data with other entities, per the smart contract 1650.

Figure 17:
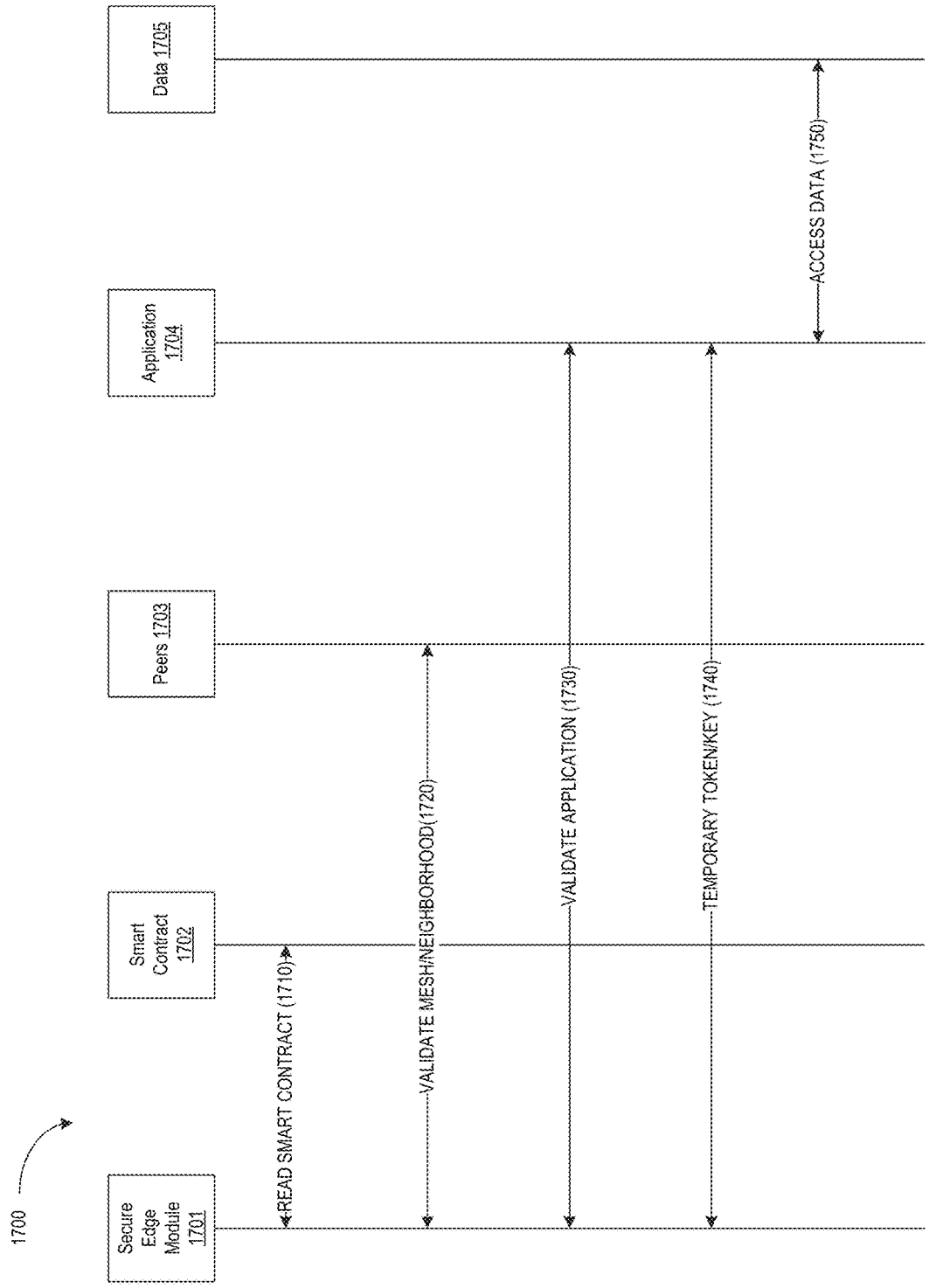
FIG. 17 is a sequence diagram illustrating communications between portions of a system architecture that manages access to data and/or operations performed by allocations, in accordance with one or more embodiments of the present disclosure.

FIG. 17 is a sequence diagram 1700 illustrating communications (e.g., messages, packets, etc.) between portions of a system architecture that manages access to data and/or operations performed by allocations, in accordance with one or more embodiments of the present disclosure. The system architecture includes a secure edge module 1701, a smart contract 1702, peers 1703 (e.g., other computing devices, other secure edge modules, etc.), an application 1704, and data 1705.

The secure edge module 1701 may access or retrieve smart contract 1702 at block 1710. For example, on an initial boot, the secure edge module 1701 may access local smart contract. In another example, the secure edge module 1701 may periodically access newer/updated smart contracts. In a further example, the secure edge module 1701 may receive a message from a computing devices that manages smart contracts. The message may indicate that an updated smart contract is available for the secure edge module 1701.

At block 1720, the secure edge module 1701 may validate the peers 1703 (e.g., meshed edges, other secure edge modules, etc.) in the system architecture. For example, the secure edge module 1701 may verify the actions and/or configurations of the other secure edge modules based on the smart contract 1702.

At block 1730, the secure edge module 1701 may validate the application 1704 to determine whether the application 1704 is allowed to perform one or more operations and/or access the data 1705. For example, the secure edge module 1701 may analyze a hash of the application 1704 and compare it with a hash stored in the smart contract 1702 (e.g., authentication/identify an application). The secure edge module 1701 may also cause the application 1704 to execute at block 1730. For example, the secure edge module 1701 may execute the application 1704 on the secure edge module 1701. In another example, the secure edge module 1701 may transmit a message to an external environment (e.g., a secure cloud service) instructing the external environment to execute the application 1704.

At block 1740, the secure edge module 1701 may optionally transmit a temporary token/key to the application 1704. The temporary key/token may allow the application 1704 to decrypt the data 1705. This temporary key/token may be provided to the application 1704 when the application 1704 is executed in an external environment. In another embodiment, when the application 1704 is executed in the secure edge module 1701, the secure edge module 1701 may directly retrieve and decrypt the data 1705, and allow the application 1704 to locally access the data 1705. At block 1750, the application 1704 may access or use the data 1705 to generate one or more inferences (e.g., perform one or more operations, actions, etc.).

Figure 18:
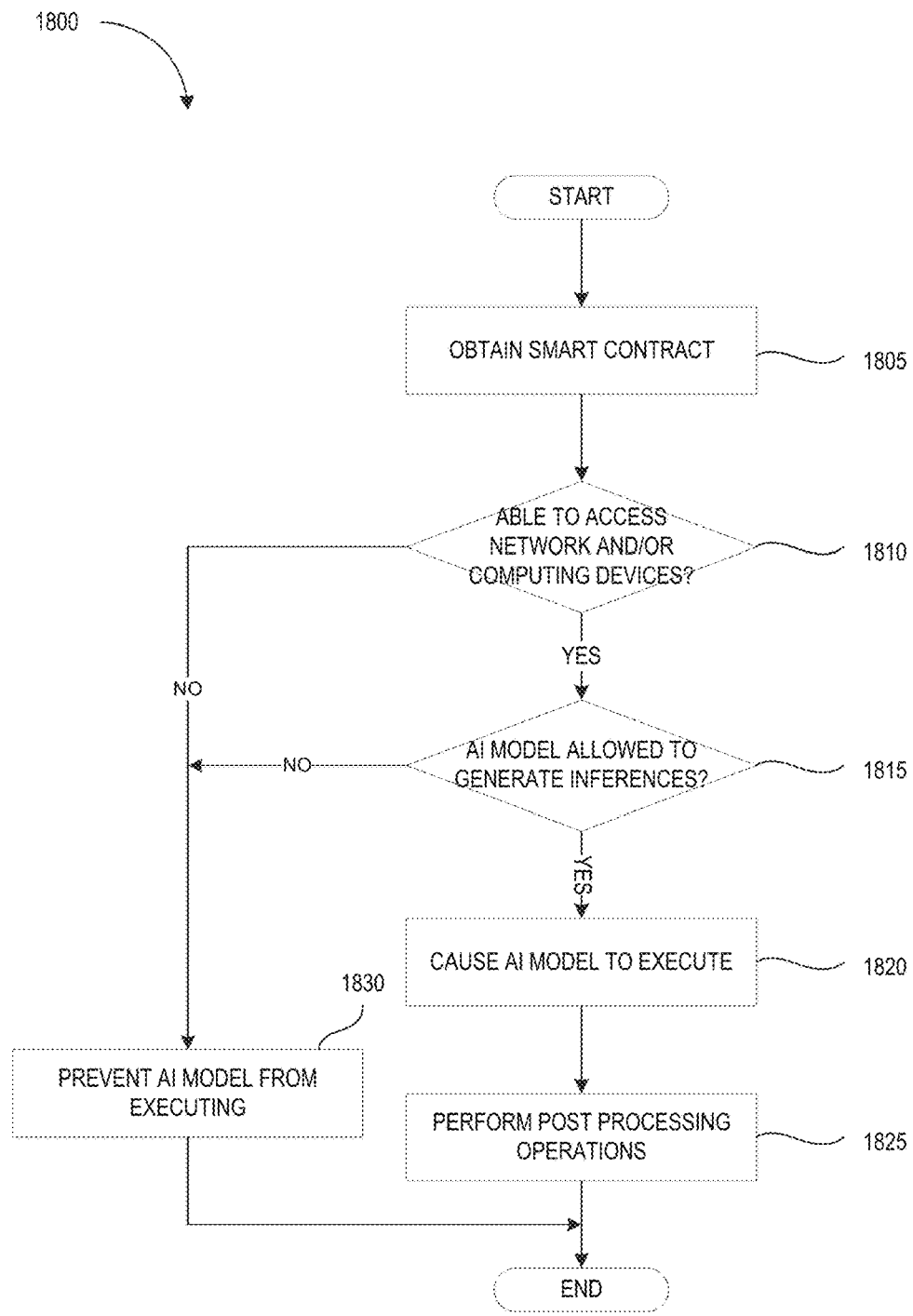
FIG. 18 is a flow diagram of a process for controlling access to data and/or managing operations of an application, in accordance with one or more embodiments of the present disclosure.

FIG. 18 is a flow diagram of a process 1800 for controlling access to data and/or managing operations of an application, in accordance with one or more embodiments of the present disclosure. Process 1800 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 1800 may be performed by a secure edge module, as illustrated in FIG. 18.

The process 1800 begins at block 1805 where the process 1800 obtains a smart contract. For example, the process 1800 may download an encrypted smart contract from a location (e.g., a storage location, a server computer, etc.). The process 1800 may also decrypt the smart contract and store the smart contract on a secure edge module. The process 1800 may optionally obtain and/or store an artificial intelligence model (e.g., an application) on the secure edge module or an external environment at block 1805. For example, the process 1800 may obtain an encrypted copy of the artificial intelligence model and decrypt the encrypted copy of the artificial intelligence model based on the smart contract.

At block 1810, the process 1800 may determine whether the process 1800 is able to access or communicate with one or more networks and/or one or more computing devices (e.g., verify peers or a neighborhood) based on the smart contract (e.g., based on mesh data), as discussed above. If the process 1800 is unable to access or communicate with one or more networks and/or one or more computing devices, the process 1800 may prevent the artificial intelligence model from executing. Optionally the process 1800 may also prevent other applications from performing operations and/or may prevent access to data. If the process 1800 is to access or communicate with one or more networks and/or one or more computing devices, the process 1800 may determine whether the artificial intelligence model is allowed to generate the set of inferences based on data. For example, the process 1800 may determine whether the smart contract gives the artificial intelligence model permission to generate one or more inferences. If the artificial intelligence model is allowed to generate the set of inferences, the process 1800 may cause the artificial intelligence model to execute. For example, the process 1800 may cause the artificial intelligence model to execute in a secure edge module or in an external environment. The artificial intelligence model may generate one or more inferences/outputs based on the data. At block 1825, the process 1800 may perform one or more post processing operations. For example, the process 1800 may delete the data and/or inferences, or may encrypt the data and/or inferences. In another example, the process 1800 may delete the application from the secure edge module or the external environment.

Figure 19:
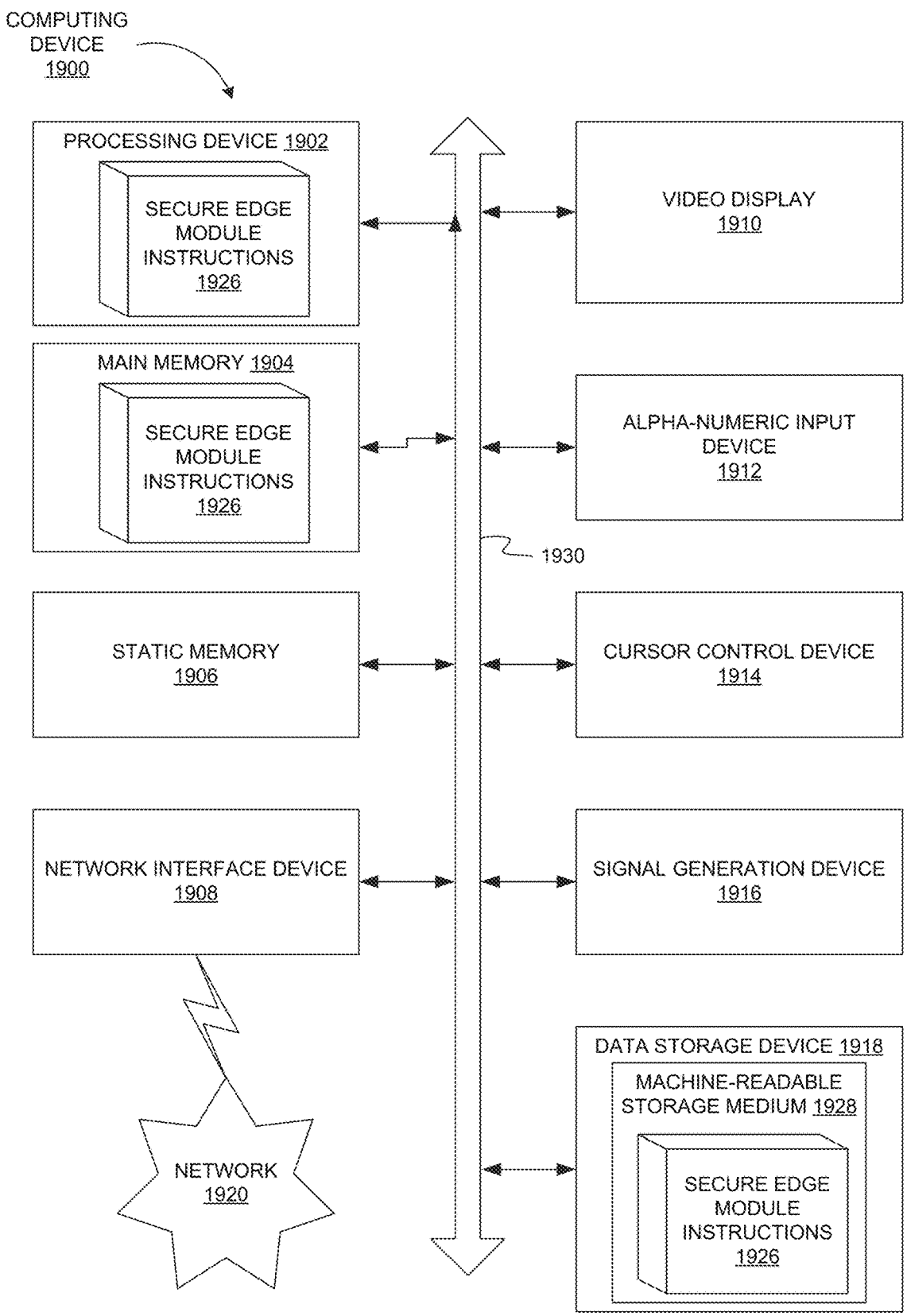
FIG. 19 is a block diagram of an example computing device that may perform one or more of the operations described herein, in accordance with some embodiments.

FIG. 19 is a block diagram of an example computing device 1900 that may perform one or more of the operations described herein, in accordance with some embodiments. Computing device 1900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1900 may include a processing device (e.g., a general purpose processor, a PLD, etc.) 1902, a main memory 1904 (e.g., synchronous dynamic random access memory (DRAM), read-only memory (ROM)), a static memory 1906 (e.g., flash memory and a data storage device 1918), which may communicate with each other via a bus 1930.

Processing device 1902 may be provided by one or more general-purpose processing devices such as a microprocessor, central processing unit, or the like. In an illustrative example, processing device 1902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1902 may also comprise one or more special-purpose processing devices such as an application specific integrated circuit (ASIC), a field programmable gate array (FPGA), a digital signal processor (DSP), network processor, or the like. The processing device 1902 may be configured to execute the operations described herein, in accordance with one or more aspects of the present disclosure, for performing the operations and steps discussed herein.

Computing device 1900 may further include a network interface device 1908 which may communicate with a network 1920. The computing device 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse) and an acoustic signal generation device 1916 (e.g., a speaker). In one embodiment, video display unit 1910, alphanumeric input device 1912, and cursor control device 1914 may be combined into a single component or device (e.g., an LCD touch screen).

Data storage device 1918 may include a computer-readable storage medium 1928 on which may be stored one or more sets of instructions, e.g., instructions for carrying out the operations described herein, in accordance with one or more aspects of the present disclosure. Instructions 1926 implementing the different systems described herein (e.g., a secure edge module) may also reside, completely or at least partially, within main memory 1904 and/or within processing device 1902 during execution thereof by computing device 1900, main memory 1904 and processing device 1902 also constituting computer-readable media. The instructions may further be transmitted or received over a network 1920 via network interface device 1908.

While computer-readable storage medium 1928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

In some embodiments, a method of verifying and/or authenticating an environment for one or more secure edge modules is provided. The method includes obtaining mesh data from a smart contract, wherein the mesh data indicates information about one or more of a network, a computing device, and a secure edge module within the environment. The method also includes verifying and/or authenticating one or more of the network, the computing device, and the secure edge module, based on the mesh data. The method further includes preventing an application from performing one or more operations in response to determining that the one or more of the network, the computing device, or the other secure edge module is not verified. The method further includes allowing the application to perform one or more operations in response to determine that that the one or more of the network, the computing device, or the other secure edge module is verified. The mesh data may indicate one or more of an IP address, an identifier, a name, a serial number, a configuration, a physical location, etc., of one or more of the network, the computing device, and the secure edge module. The mesh data 1327 may also identify networks (e.g., wireless networks) and/or other computing devices that the secure edge module 1110 should be able to communicate with (e.g., should be accessible or visible to the secure edge module 1110). Verifying/authenticating may include determining whether an identifier of a network, computing device, or secure sedge module matches a name in the smart contract. Verifying/authenticating may include determining whether an IP address of a network, computing device, or secure sedge module matches a name in the smart contract. Verifying/authenticating may include determining whether a location of a network, computing device, or secure sedge module matches a location in the smart contract. Verifying/authenticating may include determining whether a configuration of a network, computing device, or secure sedge module matches a configuration in the smart contract. The configuration may be a hardware and/or software configuration (e.g., the amount of RAM/memory, the type of processor, disk controller, OS type/version, library type/version, etc.). Verifying/authenticating may also include verifying one or more behaviors (e.g., operations/actions) of a computing device or secure edge module. For example, verifying may include determining whether the computing device periodically sends messages to other computing devices.

In some embodiments, a smart contract may include various information and/or data associated with permissions for data and/or applications. The smart contract may include blockchain data that identifying a blockchain and/or indicating a location for the blocking (e.g., a name and an IP address for a node of a blockchain). The contract may also include application data. The application data may identify an application and/or one or more operations that the application may be allowed to perform. For example, the application data may indicate a name of an application, an identifier (e.g., a serial number) of the application, etc. The application data may also include text indicating the type of inferences generated by the application. The application data may also identify one or more sets of data that the application has been granted access to. The smart contract may also include log data. The log data may include a location of an encrypted log, and the encrypted log may include information about events, operations, actions, etc., that occur within a system architecture. For example, the encrypted log may include information about transfers/delegations of permissions, request by applications to perform operations, approvals for the applications to perform the operations, etc. The smart contract may also include one or more encryption keys. The encryption keys may be used to decrypt/encrypt sets of data and/or applications. The smart contract may also include permission data. The permission data may indicate what type of operations an application is allowed to perform. The permission data may also indicate what types of permissions/access is granted to different sets of data. The smart contract may also include stakeholder data. The stakeholder data may include a list of stakeholders that are associated with the smart contract. The stakeholders may be primary stakeholders or primary stakeholders. The stakeholder data may also include a list or record of transfers/delegations of permissions/rights between different stakeholders (e.g. a chain of title/rights).

Although some of the processes or methods are described above in terms of some sequential operations, it should be appreciated that some of the operations described may be performed in a different order. Moreover, some operations may be performed in parallel rather than sequentially.

While this invention has been discussed in terms of exemplary embodiments of specific materials, and specific steps, it should be understood by those skilled in the art that variations of these specific examples may be made and/or used and that such structures and methods will follow from the understanding imparted by the practices described and illustrated as well as the discussions of operations as to facilitate modifications that may be made without departing from the scope of the invention defined by the appended claims.

What is claimed is:

1. A method, comprising:
    obtaining a first smart contract associated with a set of data, a secure edge module, and an artificial intelligence model, wherein the artificial intelligence model is configured to generate inferences;
    determining whether the artificial intelligence model is allowed to generate a set of inferences using the set of data based on the first smart contract;
    in response to determining that the artificial intelligence model is allowed to generate the set of inferences using the set of data, causing the artificial intelligence model to execute on the set of data to generate the set of inferences; and
    performing one or more post processing operations for one or more of the artificial intelligence model and the set of data based on the first smart contract;
    wherein the first smart contract indicates one or more of:
    a first set of permissions for the set of data;
    a second set of permissions for the artificial intelligence model;
    a third set of permissions for the set of inferences; and
    a set of stakeholders associated with the first smart contract.

2. The method of claim 1, wherein the first smart contract indicates at least all four of:
    a first set of permissions for the set of data;
    a second set of permissions for the artificial intelligence model;
    a third set of permissions for the set of inferences; and
    a set of stakeholders associated with the first smart contract.

3. The method of claim 1, further comprising:
    in response to determining that the artificial intelligence model is not allowed to generate the set of inferences using the set of data, preventing the artificial intelligence model from executing on the set of data.

4. The method of claim 1, further comprising:
    obtaining encrypted data based on the first smart contract; and
    decrypting the encrypted data to generate the set of data.

5. The method of claim 1, wherein obtaining the first smart contract comprises:
    determining a storage location for the first smart contract based on an entry in a blockchain;
    retrieving an encrypted smart contract from the storage location; and
    decrypting the encrypted smart contract to obtain the first smart contract.

6. The method of claim 1, wherein the secure edge module is configured to refrain from:
    performing operations that are not indicated in the first smart contract;
    executing artificial intelligence model that are not indicated in the first smart contract;
    allowing access to data that is not indicated in the first smart contract.

7. The method of claim 1, wherein the first smart contract indicates a period of time or a number of times that the artificial intelligence model is allowed to use the set of data.

8. The method of claim 1, wherein obtaining the first smart contract, determining whether the artificial intelligence model is allowed to generate the set of inferences, and causing the artificial intelligence model to execute are performed by the secure edge module.

9. The method of claim 1, wherein obtaining the first smart contract, determining whether the artificial intelligence model is allowed to generate the set of inferences, and causing the artificial intelligence model to execute are performed by a computing device separate from the secure edge module.

10. The method of claim 1, wherein:
    the first smart contract indicates configuration data for the secure edge module; and
    the configuration data indicates one or more of hardware or software used in the secure edge module.

11. An apparatus, comprising:
    a memory configured to store data; and
    a processing device comprising one or more of a complex instruction set computing (CISC) microprocessor, reduced instruction set computing (RISC) microprocessor, very long instruction word (VLIW) microprocessor, an application specific integrated circuit (ASIC), a field programmable gate array (FPGA), a digital signal processor (DSP), or a network processor, which is configured to:
        obtain a first smart contract associated with a set of data, a secure edge module, and an artificial intelligence model, wherein the artificial intelligence model is configured to generate inferences;
        determine whether the artificial intelligence model is allowed to generate a set of inferences using the set of data based on the first smart contract;
        in response to determining that the artificial intelligence model is allowed to generate the set of inferences using the set of data, cause the artificial intelligence model to execute on the set of data to generate the set of inferences; and
        performing one or more post processing operations for one or more of the artificial intelligence model and the set of data based on the first smart contract;
    wherein the processing device is configured to refrain from:
        performing operations that are not indicated in the first smart contract;
        executing artificial intelligence model that are not indicated in the first smart contract;
        allowing access to data that is not indicated in the first smart contract.

12. The apparatus of claim 11, wherein the processing device is further configured to:
    prevent the artificial intelligence model from executing on the set of data in response to determining that the artificial intelligence model is not allowed to generate the set of inferences using the set of data.

13. The apparatus of claim 11, wherein the processing device is further configured to:
    identify one or more of a set of networks and a set of computing devices based on a second smart contract;

determine whether the secure edge module is able to communicate with one or more of the set of networks and the set of computing devices;

in response to determining that the secure edge module is able to communicate with one or more of the set of networks and the set of computing devices, allow the artificial intelligence model to execute on the set of data to generate the set of inferences; and in response to determining that the secure edge module is not able to communicate with one or more of the set of networks and the set of computing devices, prevent the artificial intelligence model from using the set of data to generate the set of inferences.

14. The apparatus of claim 11, wherein the first smart contract indicates one or more of:

a first set of permissions for the set of data;

a second set of permissions for the artificial intelligence model;

a third set of permissions for the set of inferences; and a set of stakeholders associated with the first smart contract.

15. A non-transitory computer-readable storage medium including instructions that, when executed by a processing device, cause the processing device to perform operations comprising:

obtaining a first smart contract associated with a set of data, a secure edge module, and an artificial intelligence model, wherein the artificial intelligence model is configured to generate inferences;

determining whether the artificial intelligence model is allowed to generate a set of inferences using the set of data based on the first smart contract;

in response to determining that the artificial intelligence model is allowed to generate the set of inferences using the set of data, causing the artificial intelligence model to execute on the set of data to generate the set of inferences; and performing one or more post processing operations for one or more of the artificial intelligence model and the set of data based on the first smart contract;

wherein the first smart contract indicates configuration data for the secure edge module; and the configuration data indicates one or more of hardware or software used in the secure edge module.

16. The storage medium of claim 15, wherein the instructions further cause the processing device to refrain from:

performing operations that are not indicated in the first smart contract;

executing artificial intelligence model that are not indicated in the first smart contract;

allowing access to data that is not indicated in the first smart contract.

17. A method comprising:

obtaining a first smart contract associated with a set of data, a secure edge module, and an artificial intelligence model, wherein the artificial intelligence model is configured to generate inferences;

determining whether the artificial intelligence model is allowed to generate a set of inferences using the set of data based on the first smart contract;

in response to determining that the artificial intelligence model is allowed to generate the set of inferences using the set of data, causing the artificial intelligence model to execute on the set of data to generate the set of inferences;

performing one or more post processing operations for one or more of the artificial intelligence model and the set of data based on the first smart contract;

wherein the artificial intelligence model is obtained by receiving an encrypted artificial intelligence model; and decrypting the encrypted artificial intelligence model to obtain the artificial intelligence model.

18. A method comprising:

obtaining a first smart contract associated with a set of data, a secure edge module, and an artificial intelligence model, wherein the artificial intelligence model is configured to generate inferences;

determining whether the artificial intelligence model is allowed to generate a set of inferences using the set of data based on the first smart contract;

in response to determining that the artificial intelligence model is allowed to generate the set of inferences using the set of data, causing the artificial intelligence model to execute on the set of data to generate the set of inferences; and performing one or more post processing operations for one or more of the artificial intelligence model and the set of data based on the first smart contract, wherein performing the one or more post processing operations comprises one or more of:

deleting the set of data after a period of time;

deleting the artificial intelligence model after the period of time.

19. A method comprising:

obtaining a first smart contract associated with a set of data, a secure edge module, and an artificial intelligence model, wherein the artificial intelligence model is configured to generate inferences;

determining whether the artificial intelligence model is allowed to generate a set of inferences using the set of data based on the first smart contract;

in response to determining that the artificial intelligence model is allowed to generate the set of inferences using the set of data, causing the artificial intelligence model to execute on the set of data to generate the set of inferences; and performing one or more post processing operations for one or more of the artificial intelligence model and the set of data based on the first smart contract;

identifying one or more of a set of networks and a set of computing devices based on a second smart contract;

determining whether the secure edge module is able to communicate with one or more of the set of networks and the set of computing devices;

in response to determining that the secure edge module is able to communicate with one or more of the set of networks and the set of computing devices, allowing the artificial intelligence model to execute on the set of data to generate the set of inferences; and in response to determining that the secure edge module is not able to communicate with one or more of the set of networks and the set of computing devices, preventing the artificial intelligence model from using the set of data to generate the set of inferences.

20. A method comprising:

obtaining a first smart contract associated with a set of data, a secure edge module, and an artificial intelligence model, wherein the artificial intelligence model is configured to generate inferences;

determining whether the artificial intelligence model is allowed to generate a set of inferences using the set of data based on the first smart contract;

in response to determining that the artificial intelligence model is allowed to generate the set of inferences using the set of data, causing the artificial intelligence model to execute on the set of data to generate the set of inferences; and performing one or more post processing operations for one or more of the artificial intelligence model and the set of data based on the first smart contract;

wherein determining whether the artificial intelligence model is allowed to generate the set of inferences comprises:

generating a first hash based on the artificial intelligence model; and verifying the artificial intelligence model based on the first hash and a second hash indicated by the first smart contract.

* * * * *